(12) United States Patent
Nogami et al.

(10) Patent No.: US 9,768,938 B2
(45) Date of Patent: *Sep. 19, 2017

(54) COMMUNICATION METHOD

(71) Applicant: Huawei Technologies Co. Ltd., Shenzhen (CN)

(72) Inventors: Toshizo Nogami, Chiba (JP); Takashi Onodera, Yotsukaido (JP); Hidekazu Tsuboi, Chiba (JP); Shoichi Shitara, Ichihara (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,338

(22) Filed: Nov. 14, 2013

(65) Prior Publication Data

US 2014/0105142 A1 Apr. 17, 2014

Related U.S. Application Data

(60) Continuation of application No. 13/335,471, filed on Dec. 22, 2011, now Pat. No. 8,611,246, which is a (Continued)

(30) Foreign Application Priority Data

Sep. 22, 2005 (JP) .................................. 2005-276824

(51) Int. Cl.
*H04L 5/00* (2006.01)
*H04L 1/00* (2006.01)
(Continued)

(52) U.S. Cl.
CPC ............ *H04L 5/006* (2013.01); *H04L 1/0003* (2013.01); *H04L 1/0021* (2013.01);
(Continued)

(58) Field of Classification Search
CPC . H04W 72/0413; H04L 1/0003; H04L 1/0026
See application file for complete search history.

(56) References Cited

U.S. PATENT DOCUMENTS 6,694,147 B1 2/2004 Viswanath et al.
7,710,893 B2 5/2010 Yoon et al.
(Continued)

FOREIGN PATENT DOCUMENTS

CN 1466857 A 1/2004
EP 0933954 A2 8/1999
(Continued)

OTHER PUBLICATIONS

Lucent Technologies; Comments on frequency scheduling and joint power and rate optimization for OFDM; 3GPP TSG-WG1#29; R1-02-1321; Agenda item: OFDM; Nov. 5-8, 2002; Shanghai, China; total 4 pages.
(Continued)

*Primary Examiner* — Pao Sinkantarakorn
(74) *Attorney, Agent, or Firm* — Huawei Technologies Co., Ltd.

(57) ABSTRACT

A communication method of a terminal apparatus that performs communications with a base station using a plurality of frequency channels, comprising the steps of: measuring reception quality; selecting part of frequency channels as selection channels from the plurality of frequency channels; generating first information for specifying the selection channels, second information indicating reception quality of the selection channels, and third information indicating one reception quality of whole of the plurality of frequency channels, and transmitting each of the first, second and third information to the base station, wherein the
(Continued)

second information indicating the reception quality is information for specifying at least one of a modulation scheme and a coding rate.

5 Claims, 24 Drawing Sheets

Related U.S. Application Data division of application No. 11/992,103, filed as application No. PCT/JP2006/318711 on Sep. 21, 2006, now Pat. No. 8,116,216.

(51) Int. Cl.
*H04W 72/04* (2009.01)
*H04L 27/26* (2006.01)
*H04W 72/08* (2009.01)

(52) U.S. Cl.
CPC .......... *H04L 1/0025* (2013.01); *H04L 1/0026* (2013.01); *H04L 1/0032* (2013.01); *H04L 5/0007* (2013.01); *H04W 72/0413* (2013.01); *H04L 27/2608* (2013.01); *H04W 72/085* (2013.01)

(56) References Cited

U.S. PATENT DOCUMENTS

| | | |
|---|---|---|
| 2002/0147017 A1 | 10/2002 | Li et al. |
| 2004/0142714 A1 | 7/2004 | Viswanath et al. |
| 2004/0203476 A1 | 10/2004 | Liu |
| 2005/0025039 A1* | 2/2005 | Hwang ............... H04L 5/023 370/206 |
| 2005/0085236 A1 | 4/2005 | Gerlach et al. |
| 2005/0201295 A1* | 9/2005 | Kim et al. ............ 370/241 |
| 2005/0289256 A1 | 12/2005 | Cudak et al. |
| 2006/0089102 A1 | 4/2006 | Nishio et al. |
| 2006/0246916 A1 | 11/2006 | Cheng et al. |
| 2007/0060178 A1 | 3/2007 | Gorokhov et al. |
| 2007/0189212 A1 | 8/2007 | Awad et al. |
| 2012/0213301 A1 | 8/2012 | Cheng et al. |

FOREIGN PATENT DOCUMENTS

| | | |
|---|---|---|
| JP | 2003273792 A | 9/2003 |
| JP | 2004513539 A | 4/2004 |
| JP | 2004208234 A | 7/2004 |
| JP | 2005130491 A | 5/2005 |
| JP | 2006050545 A | 2/2006 |
| JP | 2006524969 A | 11/2006 |
| WO | 02/23743 A3 | 3/2002 |
| WO | 2004062148 A1 | 7/2004 |
| WO | 2004/098072 A3 | 11/2004 |
| WO | 2005/020489 A1 | 3/2005 |

OTHER PUBLICATIONS

Yoshitaka Hara et al; MC-CDM System for Packet Communications Using Frequency Scheduling; Mitsubishi Electric Corporation 5-1-1 Ofuna Kamakura Kanagawa, 247-8501, Japan; total 6 pages, Year: 2002.

Zhong-Hai Han, Yong-Hwan Lee; Opportunistic Scheduling with Partial Channel Information in OFDMA/FDD Systems; total 4 pages, Year: 2004.

* cited by examiner

| FREQUENCY CHANNEL NUMBER | CINR LEVEL |
|---|---|
| Ch2 | 2 |
| Ch5 | 8 |
| AVERAGE CINR | 2 |

FIG. 7

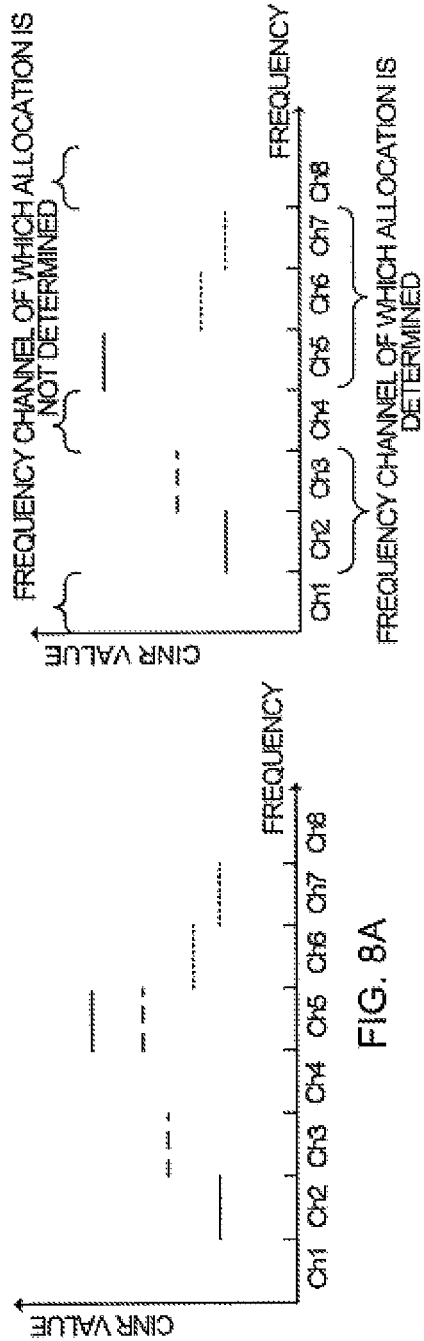
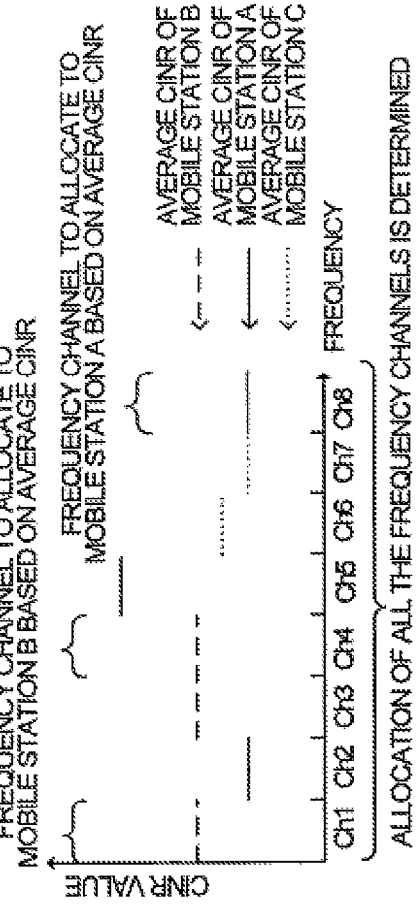

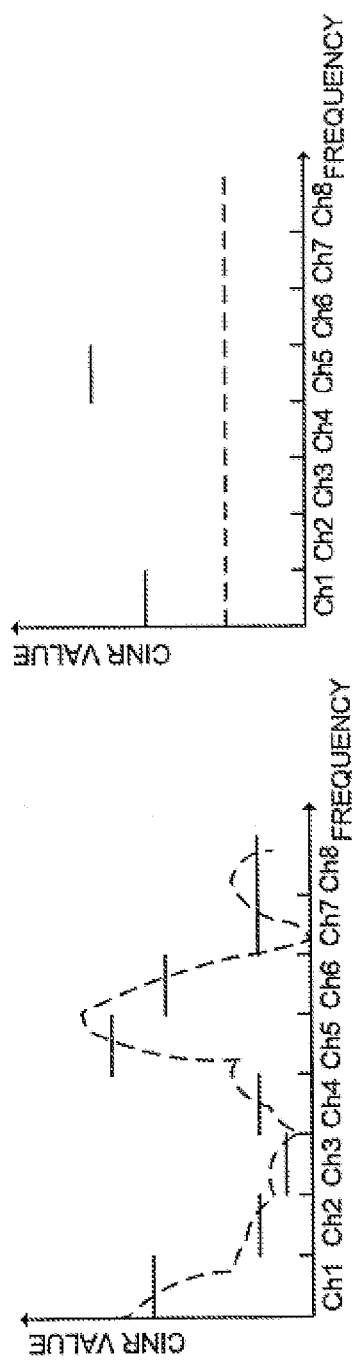

| FREQUENCY CHANNEL NUMBER | CINR LEVEL |
|---|---|
| Ch1 | 5 |
| Ch2 | 3 |
| Ch3 | 5 |
| Ch4 | 5 |
| Ch5 | 8 |
| Ch6 | 4 |
| Ch7 | 3 |
| Ch8 | 3 |

FIG. 12

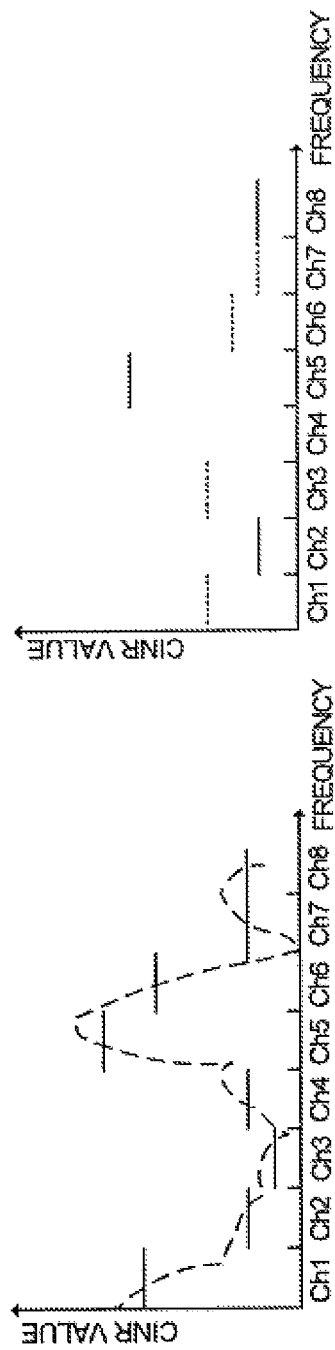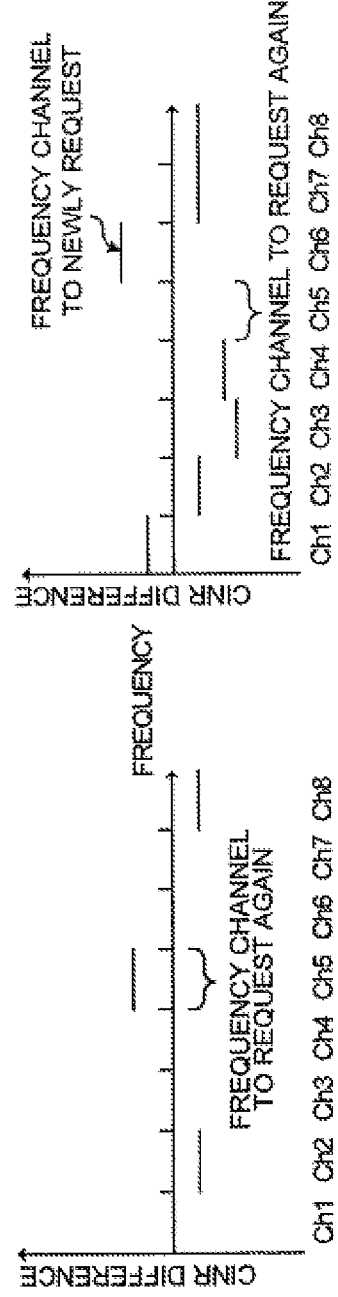

COMMUNICATION METHOD

This application is a continuation of U.S. application Ser. No. 13/335,471, filed on Dec. 22, 2011, (Issued U.S. Pat. No. 8,611,246, Issued Dec. 17, 2013), which is a divisional of U.S. application Ser. No. 11/992,103, filed on Mar. 14, 2008, (Issued U.S. Pat. No. 8,116,216, Issued Feb. 14, 2012) which claims National Stage Entry PCT Application No. PCT/JP2006/318711, filed on Sep. 21, 2006, which claims the benefit of Japanese Application No. 2005-276824, filed on Sep. 22, 2005, all of which are hereby incorporated by reference as fully set forth herein.

TECHNICAL FIELD

The present invention relates to techniques for notifying reception quality information from a communication terminal apparatus to a communication control apparatus, and techniques for assigning in the communication control apparatus the communication terminal apparatus to a respective frequency channel using the notified reception quality information, in a system where communications are performed using a plurality of frequency channels.

BACKGROUND

Currently, demand for data communications has increased in mobile communication systems, and with increases in data communications, various techniques have been proposed to obtain high spectral efficiency.

One of techniques having the potential to enhance spectral efficiency is an OFDMA (Orthogonal Frequency Division Multiple Access) technique. In this technique, communications are performed using the same frequency in all cells in a communication area comprised of the cells, OFDM is used as a modulation scheme in communicating, and TDMA (Time Division Multiple Access) and FDMA (Frequency Division Multiple Access) is used as an access scheme. This technique provides a communication scheme where an isolation cell shares the common wireless interface with the cell area, and higher-speed data communications are achieved.

As scheduling of the OFDMA system, a method is proposed where in HSDPA (High Speed Downlink Multiple Access) in a W-CDMA (Wideband-Code Division Multiple Access) mobile communication system, a communication terminal apparatus reports CQIs (Channel Quality Indicator) that are information indicating downlink conditions of all subcarriers to a base station apparatus, and the base station apparatus performs scheduling of packets based on the CQIs of all the subcarriers reported from each communication terminal apparatus ("Comments on frequency scheduling and joint power and rate optimization for OFDM", 3GPP, TSG RAN WG1 Meeting #29, R-02-1321, November 2002).

Similarly, the invention is published where in scheduling of transmission data in an OFDM system using a plurality of subcarriers, a communication terminal apparatus evaluates each of downlink channel conditions (frequency characteristics) and reports information obtained by quantizing each of the channel conditions to a base station apparatus using an uplink feedback channel, and the base station apparatus determines sub-carriers to assign to each communication terminal apparatus based on the reported information (Japanese Laid-Open Patent Publication No. 2005-130491).

SUMMARY OF THE INVENTION

However, in a system for assigning different communication terminals to a plurality of frequency channels as in OFDMA, when scheduling of transmission data is performed, a base station needs to compare the reception quality in all the frequency channels notified from all the communication terminals every period for changing the allocation. In other words, the communication terminal periodically notifies the base station of measurement results of the reception quality in all the frequency channels. Therefore, control information amounts increase on uplink, and a problem arises that overhead increases. Further, the base station performs scheduling of transmission data based on the reception quality in all the frequency channels notified from all the communication terminals.

The present invention is carried out in view of such circumstances, and provides techniques to perform scheduling for improving throughput, while suppressing control information amounts notified from communication terminal apparatuses.

To solve the above-mentioned problem, an aspect of a communication terminal apparatus according to the invention is a communication terminal apparatus that performs communications with a communication control apparatus using a plurality of channels, and is provided with a receiving section that receives a control signal from the communication control apparatus, a reception quality measuring section that measures reception quality of each of the channels, a reception quality information generating section which selects part of channels as selection channels from the plurality of channels based on the received control signal and measured reception quality measurement results, and generates reception quality information to notify the communication control apparatus of selection channel information for identifying selected selection channels and reception quality measurement results in the selected selection channels, and a transmitting section that transmits the generated reception quality information to the communication control apparatus.

Thus, according to one aspect of the communication terminal apparatus, the communication terminal apparatus selects part of frequency channels from all the frequency channels based on the reception quality measurement results, and notifies the communication control apparatus of the reception quality information of selected frequency channels, and it is thereby possible to suppress control information amounts as compared with the case of notifying the reception quality information of all the frequency channels. It is thus possible to reduce overhead due to notification of the control information.

Further, in one aspect of the communication terminal apparatus according to the invention, the reception quality information generating section has a selection channel selecting section that selects a predetermined number of channels with the reception quality measurement results being good as the selection channels, and a control information generating section that generates reception quality information including the selection channel information, and selection channel measurement results indicating the reception quality measurement results in the selection channels.

Thus, the communication terminal apparatus is capable of notifying the communication control apparatus of the frequency channels with good reception quality. By this means, the communication control apparatus allocates the frequency channels selected in the communication terminal apparatus, and is thereby capable of allocating the frequency channels with good reception quality.

Further, in one aspect of the communication terminal apparatus according to the invention, the reception quality information generating section has a selection channel selecting section that selects channels with the reception quality measurement results higher than a predetermined threshold as the selection channels, and a control information generating section that generates as reception quality information the selection channel information, and the reception quality measurement results in the selected selection channels.

Thus, the reception quality information generating section is capable of selecting channels with the reception quality measurement results higher than a threshold from a plurality of channels. It is thereby possible to notify the communication control apparatus of the channels with predetermined reception quality as selection channels.

In one aspect of the communication terminal apparatus according to the invention, the selection channel selecting section selects the selection channels in descending order of excellence of the reception quality measurement results.

Thus, it is possible to notify the communication control apparatus of the selection channels selected in descending order of excellence of the reception quality.

Another aspect of the communication terminal apparatus according to the invention is a communication terminal apparatus that performs communications with a communication control apparatus using a plurality of channels, and is provided with a receiving section that receives from the communication control apparatus the number of selectable channels for designating the number of channels to select part of channels from the plurality of channels as selection channels, a reception quality measuring section that measures reception quality of each of the channels, a reception quality information generating section which selects a number of selection channels designated by the number of selectable channels from the plurality of channels, and generates reception quality information to notify the communication control apparatus of selection channel information for identifying selected selection channels and reception quality measurement results in the selected selection channels, and a transmitting section that transmits the generated reception quality information to the communication control apparatus.

Thus, the communication terminal apparatus selects part of frequency channels from all the frequency channels based on the number of selectable channels and the reception quality measurement results, and notifies the communication control apparatus of the reception quality information of selected frequency channels, and it is thereby possible to suppress control information amounts, and to reduce overhead due to notification of the control information. Further, the communication control apparatus notifies the number of communicable channels based on the communication status, and it is thus possible on the communication control apparatus side to adjust amounts of the control information from the communication terminal apparatus.

In another aspect of the communication terminal apparatus according to the invention, the reception quality information generating section varies the number of selection channels based on the reception quality measurement results.

Thus, the reception quality information generating section is capable of varying the number of selection channels within a range of the number of selectable channels notified from the communication control apparatus, based on the measured reception quality measurement results. It is thereby possible to vary the number of selection channels to select corresponding to the reception quality measurement results, and to adjust the control information amount. For example, the control information amount is decreased when the reception quality measurement result is poor, and it is thus possible to notify the reception quality information with efficiency.

In another aspect of the communication terminal apparatus according to the invention, the reception quality information generating section varies the number of selection channels based on the number of channels allocated to the communication terminal apparatus.

Thus, the reception quality information generating section is capable of varying within a range of the number of selectable channels notified from the communication control apparatus, based on the number of channels allocated to the communication terminal apparatus and the measured reception quality measurement results. The number of channels allocated to the communication terminal apparatus can be determined based on the control information included in the control signal. It is thereby possible to vary the number of selection channels to select selection channels within a range of the number of selectable channels corresponding to the channel allocation status of the communication control apparatus, and to adjust the control information amount.

In another aspect of the communication terminal apparatus according to the invention, the reception quality information generating section varies the number of selection channels based on a priority of transmission data to request transmission thereof.

Thus, the reception quality information generating section is capable of varying the number of selection channels based on the priority of data. It is thereby possible to vary the number to select selection channels within a range of the number of selectable channels corresponding to the priority of data, and to adjust the control information amount.

Further, still another aspect of the communication terminal apparatus according to the invention is a communication terminal apparatus that performs communications with a communication control apparatus using a plurality of channels, and is provided with a receiving section that receives as an allocation measurement result a reception quality measurement result for each channel obtained by each communication terminal apparatus measuring reception quality of an allocated channel, a reception quality measuring section that measures the reception quality of each of the channels, a reception quality information generating section which selects part of channels as selection channels from the plurality of channels based on reception quality measurement results measured in the reception quality measuring section and the allocation measurement result, and generates reception quality information to notify the communication control apparatus of selection channel information for identifying selected selection channels and reception quality measurement results in the selected selection channels, and a transmitting section that transmits the generated reception quality information to the communication control apparatus.

Thus, the communication terminal apparatus selects part of frequency channels from all the frequency channels based on the reception quality measurement result measured in another communication terminal apparatus assigned to each channel and the reception quality measurement results measured in the communication terminal apparatus, and notifies the communication control apparatus of the reception quality information of selected frequency channels, and it is thereby possible to suppress control information amounts, and to reduce overhead due to notification of the control information.

Further, in still another aspect of the communication terminal apparatus according to the invention, the reception quality information generating section has a reception quality difference calculating section that compares the measured reception quality measurement result with the allocation measurement result to calculate a reception quality difference for each channel, and a selection channel selecting section that selects channels with the calculated reception quality difference larger than a predetermined threshold as the selection channels.

Thus, it is possible to select selection channels based on the reception quality difference calculated from the reception quality measurement result measured by the communication terminal apparatus and the allocation measurement result. It is thereby possible to select selection channels by relatively comparing with the reception quality measurement result measured by another communication terminal apparatus assigned to the channel.

Further, in still another aspect of the communication terminal apparatus according to the invention, the receiving section receives an allocation change candidate channel number for identifying a channel that is an allocation change candidate based on reception quality information in the communication control apparatus, and an allocation measurement result in the allocation change candidate channel, and the reception quality information generating section compares the reception quality measurement result measured in the communication terminal apparatus with the allocation measurement result in the allocation change candidate channel, and selects the selection channels based on the comparison result.

Thus, the reception quality information generating section is capable of selecting frequency channels of which allocation is desired from the allocation change candidate channels notified from the communication control apparatus. It is thereby possible to compare the reception quality measurement result of the allocation change candidate channel with the reception quality measurement result of the communication terminal apparatus, and to perform efficient scheduling.

Further, still another aspect of the communication terminal apparatus according to the invention is a communication terminal apparatus that performs communications with a communication control apparatus using a plurality of channels, and is provided with a receiving section that receives modulation parameter information for specifying a modulation parameter to specify at least one of a modulation scheme and a coding rate for each of the plurality of channels, a reception quality measuring section that measures reception quality of each of the channels, a reception quality information generating section which selects part of channels as selection channels from the plurality of channels based on the received modulation parameter information and reception quality measurement results, and generates reception quality information to notify the communication control apparatus of selection channel information for identifying selected selection channels and reception quality measurement results in the selected selection channels, and a transmitting section that transmits the generated reception quality information to the communication control apparatus.

Thus, the communication terminal apparatus selects part of frequency channels from all the frequency channels based on the modulation parameter used in each channel last time and the reception quality measurement results measured in the communication terminal apparatus, and notifies the communication control apparatus of the reception quality information of selected frequency channels, and it is thereby possible to suppress control information amounts, and to reduce overhead due to notification of the control information.

Further, still another aspect of the communication terminal apparatus according to the invention is a communication terminal apparatus that performs communications with a communication control apparatus using a plurality of channels, and is provided with a reception quality measuring section that measures reception quality of each of the channels, a reception quality information generating section which determines the number of selectable channels for designating the number of channels to select part of channels as selection channels from the plurality of channels based on reception quality measurement results, selects a number of selection channels corresponding to the determined number of selectable channels from the plurality of channels based on reception quality information, and generates reception quality information to notify the communication control apparatus of selection channel information for identifying selected selection channels and reception quality measurement results in the selected selection channels, and a transmitting section that transmits the generated reception quality information to the communication control apparatus.

Thus, the communication terminal apparatus varies (controls) the number of selection channels within a range of the number of selectable channels based on the measured reception quality measurement results, selects part of frequency channels from all the frequency channels based on the varied number of selection channels and the reception quality measurement results, and notifies the communication control apparatus of the reception quality information of selected frequency channels, and it is thereby possible to suppress control information amounts, and to reduce overhead due to notification of the control information.

Further, still another aspect of the communication terminal apparatus according to the invention is a communication terminal apparatus that performs communications with a communication control apparatus using a plurality of channels, and is provided with a reception quality measuring section that measures reception quality of each of the channels, a reception quality information generating section which determines the number of selectable channels for designating the number of channels to select part of channels as selection channels from the plurality of channels based on the number of channels allocated to the communication terminal apparatus, selects a number of selection channels corresponding to the determined number of selectable channels from the plurality of channels based on reception quality information, and generates reception quality information to notify the communication control apparatus of selection channel information for identifying selected selection channels and reception quality measurement results in the selected selection channels, and a transmitting section that transmits the generated reception quality information to the communication control apparatus.

Thus, the communication terminal apparatus selects part of frequency channels from all the frequency channels based on reception quality measurement results of a number of channels allocated to the communication terminal apparatus, and notifies the communication control apparatus of the reception quality information of selected frequency channels, and it is thereby possible to suppress control information amounts, and to reduce overhead due to notification of the control information. The number of channels allocated to the communication terminal apparatus can be determined based on the control information included in the control signal which the communication terminal apparatus receives from the communication control apparatus. It is thereby possible to vary the number of selection channels to select selection channels corresponding to the channel allocation status of the communication control apparatus, and to adjust the control information amount.

Further, still another aspect of the communication terminal apparatus according to the invention is a communication terminal apparatus that performs communications with a communication control apparatus using a plurality of channels, and is provided with a reception quality measuring section that measures reception quality of each of the channels, a reception quality information generating section which determines the number of selectable channels for designating the number of channels to select part of channels as selection channels from the plurality of channels based on a priority of data to request transmission thereof, selects a number of selection channels corresponding to the determined number of selectable channels from the plurality of channels based on reception quality information, and generates reception quality information to notify the communication control apparatus of selection channel information for identifying selected selection channels and reception quality measurement results in the selected selection channels, and a transmitting section that transmits the generated reception quality information to the communication control apparatus.

Thus, the reception quality information generating section is capable of determining the number of selection channels based on the priority of data. The communication terminal apparatus selects part of frequency channels from all the frequency channels based on the determined number of selection channels and the reception quality measurement results, and notifies the communication control apparatus of the reception quality information of selected frequency channels, and it is thereby possible to suppress control information amounts, and to reduce overhead due to notification of the control information. By this means, it is possible to vary the number to select selection channels corresponding to the priority of data, and to adjust the control information amount.

Further, in one aspect of the communication terminal apparatus according to the invention, the reception quality information generating section calculates an average measurement result obtained by averaging the reception quality measurement results of the plurality of channels, and generates the reception quality information further including the calculated average measurement result.

Thus, the communication terminal apparatus notifies the communication control apparatus of the average measurement result, and the communication control apparatus is thereby capable of grasping the reception status of the communication terminal apparatus, and using the average measurement result in allocating channels that are not selected as the selection channels.

Further, in one aspect of the communication terminal apparatus according to the invention, the reception quality information generating section generates the reception quality information including either an average value obtained by averaging reception quality measurement results in channels that are not selected as the selection channels or an average value obtained by averaging reception quality measurement results of all the plurality of channels.

Thus, the reception quality information generating section is capable of using an average value of the reception quality measurement results of all the channels or selection channels as the average measurement result.

Further, in one aspect of the communication terminal apparatus according to the invention, the reception quality information generating section selects part of channels with poor reception quality from the plurality of channels as allocation refusal channels based on the reception quality measurement results, and includes allocation refusal channel information for identifying the selected allocation refusal channels in the reception quality information.

Thus, the reception quality information generating section is capable of notifying the communication control apparatus of the allocation refusal channels to refuse allocation thereof. It is thereby possible to avoid being assigned channels with poor channel quality.

An aspect of a communication control apparatus according to the invention is a communication control apparatus that performs communications with a communication terminal apparatus using a plurality of channels, and is provided with a receiving section that receives from the communication terminal apparatus reception quality information to notify selection channel information for identifying selection channels obtained by selecting part of channels from the plurality of channels and reception quality information of the selected selection channels, a scheduler section that determines a channel to assign transmission data of which destination is the communication terminal apparatus based on the reception quality information, and a transmitting section that transmits the transmission data of which destination is the communication terminal apparatus.

Thus, according to one aspect of the communication control apparatus according to the invention, since the communication control apparatus acquires the reception quality information of part of frequency channels selected by the communication terminal apparatus, it is possible to suppress control information amounts as compared with the case of notifying the reception quality information of all the frequency channels, and it is thus possible to reduce overhead due to notification of the control information. Further, the communication control apparatus assigns the frequency channels selected by the communication terminal apparatus, and is thereby capable of allocating frequency channels with good reception quality.

Further, in one aspect of the communication control apparatus according to the invention, the receiving section receives reception quality information including the selection channel information, and selection channel measurement results indicating reception quality measurement results in the selection channels from each of a plurality of communication terminal apparatuses, the scheduler section selects a communication terminal apparatus with a good reception quality measurement result for each channel based on the selection channel information and the selection channel measurement results transmitted from each of the plurality of communication terminal apparatuses, and determines a channel to assign transmission data of which destination is the communication terminal apparatus, and the transmitting section transmits the transmission data of which destination is the communication terminal apparatus selected for each channel.

Thus, the scheduler section is capable of performing scheduling of channels on communication terminal apparatuses with good reception quality based on the reception quality information notified from the communication terminal apparatuses.

Further, another aspect of the communication control apparatus according to the invention is a communication control apparatus that performs communications with a communication terminal apparatus using a plurality of channels, and is provided with a transmitting section that transmits to the communication terminal apparatus the number of selectable channels for designating the number of channels for the communication terminal apparatus to select part of channels from the plurality of channels as selection channels, a receiving section that receives from the communication terminal apparatus reception quality information to notify selection channel information for identifying the selection channels obtained by selecting part of channels from the plurality of channels based on the number of selectable channels and reception quality of the selected selection channels, and a scheduler section that determines a channel to assign transmission data of which destination is the communication terminal apparatus based on the reception quality information, where the transmitting section transmits the transmission data of which destination is the communication terminal apparatus selected for each channel.

Thus, since the communication control apparatus acquires the reception quality information of frequency channels selected by the communication terminal apparatus corresponding to the number of selectable channels, it is possible to suppress control information amounts as compared with the case of notifying the reception quality information of all the frequency channels, and it is thus possible to reduce overhead due to notification of the control information. Further, the communication control apparatus assigns the frequency channels selected by the communication terminal apparatus, and is thereby capable of allocating frequency channels with good reception quality. The communication control apparatus thus notifies the communication terminal apparatus of the number of selectable channels, and is thereby capable of adjusting the reception quality information amount notified from the communication terminal apparatus corresponding to the communication status.

Still another aspect of the communication control apparatus according to the invention is a communication control apparatus that performs communications with a communication terminal apparatus using a plurality of channels, and is provided with a receiving section that receives from the communication terminal apparatus reception quality information to notify selection channel information for identifying selection channels obtained by selecting part of channels from the plurality of channels and reception quality of the selected selection channels, a scheduler section that determines a channel to assign transmission data of which destination is the communication terminal apparatus based on the reception quality information, and a transmitting section that transmits the transmission data of which destination is the communication terminal apparatus, where the scheduler section assigns the communication terminal apparatus to each of the channels based on the reception quality information, and generates for each of the plurality of channels, an allocation measurement result using the reception quality measurement result measured by the communication terminal apparatus assigned to each of the channels, and the transmitting section transmits the generated allocation measurement result to each communication terminal apparatus.

Thus, according to still another aspect of the communication control apparatus of the invention, the scheduler section is capable of generating the allocation measurement result indicating the reception quality measurement result of each of the channels using the reception quality measurement result measured by the assigned communication terminal apparatus. The communication control apparatus is thereby capable of notifying each communication terminal apparatus of the reception quality measurement result of each of the channels measured by the communication terminal apparatus assigned to each of the channels. Further, the communication terminal apparatus is capable of selecting selection channels by comparing the allocation measurement result with the reception quality measurement result measured by the communication terminal apparatus. Accordingly, since the communication control apparatus acquires the reception quality information of part of frequency channels selected by the communication terminal apparatus based on the allocation measurement result, it is possible to suppress control information amounts as compared with the case of notifying the reception quality information of all the frequency channels, and it is thus possible to reduce overhead due to notification of the control information.

Further, in still another aspect of the communication control apparatus according to the invention, there is further provided an allocation change candidate channel selecting section that selects a channel lower than a predetermined condition as an allocation change candidate channel, based on the allocation measurement result generated by the scheduler section, and the transmitting section transmits allocation change candidate channel information for identifying the allocation change candidate channel, and the allocation measurement result in the allocation change candidate channel to each communication terminal apparatus.

Thus, the scheduler section is capable of selecting the allocation change candidate channel to notify to the communication terminal apparatus. The communication terminal apparatus is thereby capable of selecting a channel with the good reception quality expectation result of the communication terminal apparatus as a selection channel by comparing with the allocation change candidate channel, and the communication control apparatus is capable of receiving from the communication terminal apparatus on the channel with the reception quality better than the reception quality measurement result of the allocation change candidate channel.

Further, still another aspect of the communication control apparatus according to the invention is a communication control apparatus that performs communications with a communication terminal apparatus using a plurality of channels, and is provided with a scheduler section which judges a priority of transmission data, and determines the number of selectable channels to allocate to a communication terminal apparatus that is a destination of the transmission data corresponding to the judged priority, a transmitting section that transmits the determined number of selectable channels to each communication terminal apparatus, and a receiving section that receives from the communication terminal apparatus reception quality information to notify selection channel information for identifying the selection channels obtained by selecting part of channels from the plurality of channels based on the number of selectable channels and reception quality of the selected selection channels, where the scheduler section determines a channel to assign transmission data of which destination is the communication terminal apparatus based on the reception quality information, and the transmitting section transmits transmission data of which destination is the communication terminal apparatus selected for each channel.

Thus, according to still another aspect of the communication control apparatus according to the invention, since the scheduler section determines the number of selectable channels based on the priority of transmission data, the communication control apparatus is capable of adjusting communication circumstances of the entire system corresponding to the priority of data. By this means, since the communication control apparatus acquires the reception quality information of frequency channels selected by the communication terminal apparatus corresponding to the number of selectable channels, it is possible to suppress control information amounts as compared with the case of notifying the reception quality information of all the frequency channels, and it is thus possible to reduce overhead due to notification of the control information. Further, the communication control apparatus assigns the frequency channels selected by the communication terminal apparatus, and is thereby capable of allocating frequency channels with good reception quality.

Further, in still another aspect of the communication control apparatus according to the invention, there is further provided a statistical processing section that updates the number of selectable channels of each communication terminal apparatus based on the number of channels allocated to each communication terminal apparatus by the scheduler section, and the number of selection channels notified from each communication terminal apparatus, and the transmitting section transmits the updated number of selectable channels to each communication terminal apparatus.

Thus, the statistical processing section is capable of updating the number of selectable channels based on the number of channels actually allocated to the communication terminal apparatus, and the number of selection channels notified from the communication terminal apparatus. It is thereby possible to vary the number of selection channels for the communication terminal apparatus to select, corresponding to the communication status.

In one aspect of the communication control apparatus according to the invention, the receiving section receives, from each of a plurality of communication terminal apparatuses, reception quality information including the selection channel information, reception quality measurement results in the selection channels, and an average measurement result obtained by averaging a plurality of reception quality measurement results of each of the communication terminal apparatuses, and based on the average measurement result, the scheduler section assigns each of the communication terminal apparatuses to a channel that is not selected as the selection channel by each of the communication terminal apparatuses.

Thus, the scheduler section is capable of performing scheduling on a channel (that is a channel of which reception quality measurement result is not notified from any communication terminal apparatus) which is not selected by each communication terminal apparatus as the selection channel, based on the average measurement result.

In one aspect of the communication control apparatus according to the invention, the receiving section receives the reception quality information from each of a plurality of communication terminal apparatuses, and the scheduler section assigns the last assigned communication terminal apparatus to a channel that is not selected as the selection channel by each of the communication terminal apparatuses.

Thus, the scheduler section assigns the last assigned communication terminal apparatus to a channel that is not selected last time as the selection channel, and is thereby capable of suppressing the load on scheduling.

In one aspect of the communication control apparatus according to the invention, the receiving section receives the reception quality information from each of a plurality of communication terminal apparatuses, and the scheduler section assigns each of the communication terminal apparatuses to a channel that is not selected as the selection channel by each of the communication terminal apparatuses using a round-robin method.

Thus, the scheduler section is capable of performing scheduling on the channel that is not selected as the selection channel by each of the communication terminal apparatuses using the round-robin method.

In one aspect of the communication control apparatus according to the invention, there is further provided a modulation parameter selecting section that selects a modulation parameter for specifying at least one of a modulation scheme and a coding rate for each of the plurality of frequency channels, based on the reception quality information received from the communication terminal apparatus.

Thus, the modulation parameter selecting section is capable of selecting a modulation parameter based on the reception quality information notified from each of the communication terminal apparatuses.

In one aspect of the communication control apparatus according to the invention, the scheduler section assigns each of the communication terminal apparatuses to a channel that is not selected as the selection channel by each of the communication terminal apparatuses based on an average measurement result, and there is further provided a modulation parameter selecting section that selects a modulation parameter for the channel that is not selected as the selection channel by each of the communication terminal apparatuses based on the average measurement result.

Thus, modulation parameter selecting section is capable of selecting a modulation parameter for a channel that is not selected as the selection channel by each of the communication terminal apparatuses based on the average measurement result. It is thereby possible to select a modulation parameter corresponding to reception conditions of the communication terminal apparatus that is a destination for the channel of which reception quality information is not notified.

In one aspect of the communication control apparatus according to the invention, the receiving section receives reception quality information including allocation refusal channel information for identifying an allocation refusal channel to which the communication terminal apparatus refuses to being assigned, and the scheduler section does not assign the communication terminal apparatus notifying the allocation refusal channel information to the channel indicated by the allocation refusal channel information.

Thus, the scheduler section avoids assigning the communication terminal apparatus notifying the allocation refusal channel to the allocation refusal channel, and is thereby capable of preventing scheduling on each of the communication terminal apparatuses to a channel with poor reception quality.

In one aspect of the communication control apparatus according to the invention, the scheduler section divides a channel that is not selected as the selection channel by the communication terminal apparatus into a plurality of sub-channels, and assigns a plurality of communication terminal apparatuses to the plurality of divided sub-channels.

Thus, for the channel that is not selected as the selection channel by any communication terminal apparatus, the scheduler section is capable of dividing the channel into a plurality of sub-channels to assign a plurality of communication terminal apparatuses. It is thus possible to obtain the effect of frequency diversity.

An aspect of a communication system according to the invention is a communication system where communications are performed between a communication control apparatus and a communication terminal apparatus using a plurality of channels, where the communication terminal apparatus is provided with a terminal-side receiving section that receives a control signal from the communication control apparatus, a reception quality measuring section that measures reception quality of each of the channels, a reception quality information generating section which selects part of channels as selection channels from the plurality of channels based on the received control signal and measured reception quality measurement results, and generates reception quality information to notify the communication control apparatus of selection channel information for identifying selected selection channels and reception quality measurement results in the selected selection channels, and a terminal-side transmitting section that transmits the generated reception quality information to the communication control apparatus, and the communication control apparatus is provided with a control-side receiving section that receives the reception quality information in the selection channels from the communication terminal apparatus, a scheduler section that selects at least one channel from the selection channels based on the reception quality information, and a control-side transmitting section that assigns transmission data of which destination is the communication terminal apparatus to the selected channel to transmit.

Thus, according to one aspect of the communication system according to the invention, the communication terminal apparatus selects part of frequency channels from all the frequency channels, and notifies the communication control apparatus of the reception quality information of selected frequency channels. It is thereby possible to suppress control information amounts as compared with the case of notifying the reception quality information of all the frequency channels, and it is thus possible to reduce overhead due to notification of the control information. Further, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality.

Further, an aspect of a communication method according to the invention is a communication method of a communication terminal apparatus that performs communications with a communication control apparatus using a plurality of channels, where a control signal is received from the communication control apparatus, reception quality of each of the channels is measured, part of channels are selected as selection channels from the plurality of channels based on the received control signal and measured reception quality measurement results, reception quality information is generated to notify the communication control apparatus of selection channel information for identifying selected selection channels and reception quality measurement results in the selected selection channels, and the generated reception quality information is transmitted to the communication control apparatus.

Thus, according to one aspect of the communication method, the communication terminal apparatus selects part of frequency channels from all the frequency channels based on the reception quality measurement results, and notifies the communication control apparatus of the reception quality information of selected frequency channels, and it is thereby possible to suppress control information amounts as compared with the case of notifying the reception quality information of all the frequency channels. It is thus possible to reduce overhead due to notification of the control information.

Further, another aspect of the communication method according to the invention is a communication method of a communication control apparatus that performs communications with a communication terminal apparatus using a plurality of channels, where reception quality information is received from the communication terminal apparatus to notify selection channel information for identifying selection channels obtained by selecting part of channels from the plurality of channels and reception quality of the selected selection channels, a channel to assign transmission data of which destination is the communication terminal apparatus is determined based on the reception quality information, and the transmission data of which destination is the communication terminal apparatus is transmitted on the selected channel.

Thus, according to another aspect of the communication method according to the invention, since the communication control apparatus acquires the reception quality information of part of frequency channels selected by the communication terminal apparatus, it is possible to suppress control information amounts as compared with the case of notifying the reception quality information of all the frequency channels, and it is thus possible to reduce overhead due to notification of the control information. Further, the communication control apparatus assigns the frequency channels selected by the communication terminal apparatus, and is thereby capable of allocating frequency channels with good reception quality.

Further, still another aspect of the communication method according to the invention is a communication method where communications are performed between a communication control apparatus and a communication terminal apparatus using a plurality of channels, where the communication terminal apparatus receives a control signal from the communication control apparatus, measures reception quality of each of the channels, selects part of channels as selection channels from the plurality of channels based on the received control signal and measured reception quality measurement results, generates reception quality information to notify the communication control apparatus of selection channel information for identifying selected selection channels and reception quality measurement results in the selected selection channels, and transmits the generated reception quality information to the communication control apparatus, and the communication control apparatus receives the reception quality information in the selection channels from the communication terminal apparatus, determines a channel to assign transmission data of which destination is the communication terminal based on the reception quality information, and transmits the transmission data of which destination is the communication terminal apparatus on the selected channel.

Thus, according to still another aspect of the communication method according to the invention, the communication terminal apparatus selects part of frequency channels from all the frequency channels, and notifies the communication control apparatus of the reception quality information of selected frequency channels. It is thereby possible to suppress control information amounts as compared with the case of notifying the reception quality information of all the frequency channels, and it is thus possible to reduce overhead due to notification of the control information. Further, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality.

Further, to solve the problem associated with the invention, following aspects may be adopted. An aspect of the communication terminal apparatus according to the invention is a communication terminal apparatus that performs communications with a communication control apparatus using a plurality of channels, and is characterized by having a receiving section that receives a control signal from the communication control apparatus, a reception quality measuring section that measures reception quality of each of the channels based on the received control signal, a reception quality information generating section which selects part of channels as selection channels from the plurality of channels based on measured reception quality measurement results, and generates reception quality information to notify a communication-destination apparatus (the communication control apparatus) of reception quality measurement results in the selected selection channels, and a transmitting section that transmits the generated reception quality information to the communication control apparatus.

Thus, according to one aspect of the communication terminal apparatus, the communication terminal apparatus is capable of selecting part of frequency channels from all the frequency channels, and notifying the communication control apparatus of the reception quality information of selected frequency channels. As compared with the case of notifying the reception quality information of all the frequency channels, it is possible to suppress control information amounts, and to reduce overhead due to notification of the control information.

Further, in one aspect of the communication terminal apparatus according to the invention, the reception quality information generating section is characterized by having a selection channel selecting section that selects a predetermined number of channels with the reception quality measurement results being good as the selection channels, and a control information generating section that generates reception quality information including selection channel numbers for identifying the selected selection channels, and selection channel measurement results indicating the reception quality measurement results in the selection channels.

Thus, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality.

In one aspect of the communication terminal apparatus according to the invention, the reception quality information generating section is characterized by having a selection channel selecting section that selects channels with the reception quality measurement results higher than a predetermined threshold as the selection channels, and a control information generating section that generates as reception quality information the reception quality measurement results in the selected selection channels.

Thus, the reception quality information generating section is capable of selecting channels with the reception quality measurement results higher than the threshold from a plurality of channels. It is thereby possible to notify the communication control apparatus of the channels with predetermined reception quality as selection channels.

In one aspect of the communication terminal apparatus according to the invention, the reception quality information generating section is characterized by having a selection channel selecting section that selects a number of channels with the reception quality measurement results being good where the number corresponds to a threshold set by the communication terminal apparatus, and a reception quality information generating section that generates as reception quality information the reception quality measurement results in the selected selection channels.

By this means, it is possible to notify the communication control apparatus of the selection channels selected in descending order of excellence of the reception quality.

In one aspect of the communication terminal apparatus according to the invention, the selection channel selecting section is characterized by selecting selection channels in descending order of excellence of the reception quality measurement result.

By this means, the selection channel selecting section is capable of selecting selection channels in descending order of excellence of the reception quality measurement result.

Further, in one aspect of the communication terminal apparatus according to the invention, features are that the receiving section receives the number of selectable channels for designating the number of channels to select, and that the selection channel selecting section selects a number of selection channels designated by the received number of selectable channels.

Thus, the communication control apparatus notifies the number of communicable channels based on the communication status, and it is thus possible on the communication control apparatus side to adjust amounts of the control information from the communication terminal apparatus.

In one aspect of the communication terminal apparatus according to the invention, the control information generating section is characterized by calculating an average measurement result obtained by averaging the reception quality measurement results of a plurality of channels, and generating the reception quality information further including the calculated average measurement result.

Thus, by notifying the communication control apparatus of the average measurement result, the communication control apparatus is capable of using the average measurement result in allocating channels that are not selected as the selection channels.

In one aspect of the communication terminal apparatus according to the invention, the control information generating section is characterized by generating the reception quality information including either an average value obtained by averaging reception quality measurement results in channels that are not selected as the selection channels or an average value obtained by averaging reception quality measurement results of all the plurality of channels, as the average measurement result.

Thus, the control information generating section is capable of using the average value of the reception quality measurement results of all the channels or selection channels as the average measurement result.

In one aspect of the communication terminal apparatus according to the invention, features are that the receiving section receives as an allocation measurement result a reception quality measurement result for each channel obtained by each communication terminal apparatus measuring reception quality of an allocated channel, and that the selection channel selecting section selects a predetermined number of channels based on the reception quality measurement result measured by the communication terminal apparatus and the allocation measurement result.

Thus, the selection channel selecting section is capable of selecting selection channels based on the reception quality measurement result assigned to each channel.

In one aspect of the communication terminal apparatus according to the invention, features are that the reception quality information generating section further has a reception quality difference calculating section that compares the measured reception quality measurement result with the allocation measurement result to calculate a reception quality difference, and that the selection channel selecting section selects channels with the calculated reception quality difference larger than a predetermined threshold as the selection channels.

Thus, by having the reception quality difference calculating section, the selection channel selecting section is capable of selecting, selection channels based on the reception quality difference.

In one aspect of the communication terminal apparatus according to the invention, the reception quality difference calculating section is characterized by calculating as the reception quality difference either a difference between the measured reception quality measurement result and the allocation measurement result or a ratio between the measured reception quality measurement result and the allocation measurement result.

Thus, the reception quality difference calculating section is capable of calculating the reception quality difference using calculation of comparing two values to obtain a difference, ratio or the like.

In one aspect of the communication terminal apparatus according to the invention, the selection channel selecting section is characterized by preferentially selecting, as the selection channels, channels that are allocated to the communication terminal apparatus last time from among the channels with the reception quality difference larger than a predetermined threshold.

Thus, the selection channel selecting section is capable of selecting selection channels using a threshold.

In one aspect of the communication terminal apparatus according to the invention, features are that the receiving section receives an allocation change candidate channel number for identifying a channel that is an allocation change candidate based on reception quality information in the communication control apparatus, and the reception quality measurement result in the allocation change candidate channel, and that the selection channel selecting section compares the reception quality measurement result measured in the communication terminal apparatus with the reception quality measurement result in the allocation change candidate channel, and selects selection channels based on the comparison result.

Thus, the selection channel selecting section is capable of selecting frequency channels of which allocation is desired from the allocation change candidate channels notified from the communication control apparatus. It is thereby possible to compare with the reception quality measurement result of the communication terminal apparatus in each channel, and to perform efficient scheduling.

In one aspect of the communication terminal apparatus according to the invention, the reception quality information generating section is characterized by selecting part of channels from a plurality of channels as allocation refusal channels based on the reception quality measurement results, and including allocation refusal channel numbers for identifying the selected allocation refusal channels in the reception quality information.

Thus, the reception quality information generating section is capable of notifying the communication control apparatus of the allocation refusal channels to refuse the allocation thereof. It is thereby possible to avoid assigning channels with poor channel quality.

In one aspect of the communication terminal apparatus according to the invention, the reception quality information generating section is characterized by selecting channels with the reception quality measurement results lower than a predetermined threshold as allocation refusal channels.

By this means, the reception quality information generating section is capable of selecting the allocation refusal channels using a threshold.

In one aspect of the communication terminal apparatus according to the invention, the reception quality information generating section is characterized by selecting a predetermined number of channels in descending order of poorness of the reception quality measurement results as allocation refusal channels.

By this means, the reception quality information generating section is capable of selecting the allocation refusal channels from channels with poor reception quality.

In one aspect of the communication terminal apparatus according to the invention, the selection channel selecting section is characterized by selecting channels with calculated reception quality differences smaller than a predetermined threshold as allocation refusal channels, and including allocation refusal channel numbers for identifying the selected allocation refusal channels in the reception quality information.

By this means, the selection channel selecting section is capable of selecting allocation refusal channel based on the reception quality difference.

In one aspect of the communication terminal apparatus according to the invention, features are that the reception quality information generating section further has a modulation parameter selecting that selects a modulation parameter for specifying at least one of a modulation scheme and a coding rate, based on the reception quality measurement result, and that the control information generating section generates reception quality measurement information including the modulation parameter as the reception quality measurement result.

By this means, the reception quality information generating section is capable of selecting a modulation parameter based on the reception quality measurement result.

In one aspect of the communication terminal apparatus according to the invention, the reception quality information generating section is characterized by generating the reception quality information using at least one of the received signal power, success or failure of reception and a transmission rate as the reception quality measurement result.

Thus, the reception quality information generating section is capable of using any one of the received signal power, success or failure of reception and a transmission rate as the reception quality.

In one aspect of the communication terminal apparatus according to the invention, features are that the receiving section receives modulation parameter information for specifying a modulation parameter to specify at least one of a modulation scheme and a coding rate for each of a plurality of channels, and that the reception quality information generating section has a modulation parameter selecting that selects a modulation parameter for each channel, a selection channel selecting section that compares the received modulation parameter information with the modulation parameter for each of the selected channels to select selection channels, and a control information generating section that generates the reception quality information including selection channel numbers for identifying the selected selection channels, and selection channel measurement results indicating reception quality measurement results in the selection channels.

Thus, the reception quality information generating section is capable of generating the reception quality information based on the modulation parameter.

In one aspect of the communication terminal apparatus according to the invention, the reception quality information generating section is characterized by changing the threshold based on the reception quality measurement result.

The reception quality information generating section changes the threshold corresponding to the reception quality measurement result, and it is thereby possible to change the reception quality of selection channels or the number of selection channels corresponding to the reception quality. By this means, it is possible to change a threshold for selecting selection channels corresponding to the reception quality measurement result, and to adjust control information amounts.

In one aspect of the communication terminal apparatus according to the invention, features are that the receiving section receives as an allocation measurement result the reception quality measurement result measured by another communication terminal apparatus assigned to each channel, and that the reception quality information generating section changes the threshold based on the reception quality measurement result measured by the communication terminal apparatus and the allocation measurement result.

Thus, the reception quality information generating section is capable of changing the threshold based on the reception quality measurement result measured by the communication terminal apparatus assigned to the channel by the communication control apparatus. By this means, it is possible to change the threshold for selecting selection channels corresponding to the channel allocation status of the communication control apparatus, and to adjust control information amounts.

In one aspect of the communication terminal apparatus according to the invention, the reception quality information generating section is characterized by changing the threshold based on a priority of data to request transmission thereof.

Thus, the reception quality information generating section is capable of changing the threshold based on the priority of data. It is thereby possible to change the threshold for selecting selection channels based on the priority of data, and to adjust control information amounts.

An aspect of a communication control apparatus according to the invention is a communication control apparatus that performs communications with a communication terminal apparatus using a plurality of channels, and is characterized by having a receiving section that receives from the communication terminal apparatus reception quality information to notify reception quality of selection channels obtained by selecting part of channels from the plurality of channels, a scheduler section that selects at least one channel from the selection channels based on the reception quality information, and a transmitting section that assigns transmission data of which destination is the communication terminal apparatus to the selected channel to transmit.

Thus, according to one aspect of the communication control apparatus according to the invention, the communication terminal apparatus selects part of frequency channels from all the frequency channels, and it is possible to obtain the reception quality information of the selected frequency channels. As compared with the case of notifying the reception quality information of all the frequency channels, it is possible to suppress control information amounts, and to reduce overhead due to notification of the control information. The communication control apparatus assigns the frequency channels selected in the communication terminal apparatus, and is thereby capable of allocating the frequency channels with good reception quality.

Further, in one aspect of the communication control apparatus according to the invention, features are that the receiving section receives the reception quality information including selection channel numbers for identifying the selection channels, and selection channel measurement results indicating reception quality measurement results in the selection channels from each of a plurality of communication terminal apparatuses, the scheduler section selects a communication terminal apparatus with a good reception quality measurement result for each channel based on the selection channel information and the selection channel measurement results transmitted from each of the plurality of communication terminal apparatuses, and that the transmitting section assigns transmission data of which destination is the communication terminal apparatus selected for each channel to transmit.

Thus, the scheduler section is capable of performing scheduling on communication terminal apparatuses with good reception quality to channels based on the reception quality information notified from the communication terminal apparatuses.

Further, in one aspect of the communication control apparatus according to the invention, features are that the receiving section receives the reception quality information further including an average measurement result obtained by averaging a plurality of reception quality measurement results of each communication terminal apparatus, and that the scheduler section assigns each communication terminal apparatus to a channel that is not selected as the selection channel by any communication terminal apparatus based on the average measurement result.

Thus, the scheduler section is capable of acquiring the average measurement result. By his means, it is possible to perform scheduling on a channel that is not selected as the selection channel by any communication terminal apparatus, i.e. a channel of which reception quality measurement result is not notified, based on the average measurement result.

In one aspect of the communication control apparatus according to the invention, the scheduler section is characterized by assigning the last assigned communication terminal apparatus to a channel that is not selected as the selection channel by any communication terminal apparatus.

Thus, the scheduler section is capable of assigning the last assigned communication terminal apparatus to a channel that is not selected last time as the selection channel. It is thereby possible to suppress the load of scheduling.

In one aspect of the communication control apparatus according to the invention, the scheduler section is characterized by assigning each communication terminal apparatus to a channel that is not selected as the selection channel by any communication terminal apparatus using the round-robin method.

Thus, the scheduler section is capable of performing scheduling on the channel that is not selected as the selection channel by any communication terminal apparatus using the round-robin method.

In one aspect of the communication control apparatus according to the invention, features are that the scheduler section determines the number of selectable channels that can be selected in the communication terminal apparatus corresponding to transmission data requested from each communication terminal apparatus, and that the transmitting section transmits the determined selectable channel to each communication terminal apparatus.

Thus, in the scheduler section, since the communication control apparatus notifies the communication terminal apparatus of the number of selectable channels, it is possible on the communication control apparatus side to adjust reception quality information amounts notified from the communication terminal apparatus corresponding to the communication status.

In one aspect of the communication control apparatus according to the invention, features are that the scheduler section assigns the communication terminal apparatus to each of the channels based on the reception quality information, and generates for each of the plurality of channels, an allocation measurement result using the reception quality measurement result measured by the communication terminal apparatus assigned to each of the channels, and that the transmitting section transmits the generated allocation measurement result to each communication terminal apparatus.

Thus, the scheduler section is capable of generating the allocation measurement result indicating the reception quality measurement result of each of the channels using the reception quality measurement result measured by the assigned communication terminal apparatus. The communication control apparatus is thereby capable of notifying each communication terminal apparatus of the reception quality measurement result of each of the channels measured by the communication terminal apparatus assigned to each of the channels. The communication terminal apparatus is capable of selecting selection channels by comparing the allocation measurement result with the reception quality measurement result measured by the communication terminal apparatus.

In one aspect of the communication control apparatus according to the invention, features are that a channel lower than a predetermined condition is selected as an allocation change candidate channel based on the allocation measurement result generated by the scheduler section, allocation change candidate information is generated using an allocation change candidate channel number for identifying the selected allocation change candidate channel, and the reception quality measurement result in the allocation change candidate channel, and that the transmitting section transmits the generated allocation change candidate information to each communication terminal apparatus.

Thus, the scheduler section is capable of selecting the allocation change candidate channel to notify to the communication terminal apparatus. The communication terminal apparatus is thereby capable of selecting a channel with the good reception quality expectation result of the communication terminal apparatus as a selection channel by comparing with the allocation change candidate channel.

In one aspect of the communication control apparatus according to the invention, features are that the receiving section receives reception quality information including an allocation refusal channel number to which the communication terminal apparatus refuses to being assigned, and that the scheduler section does not assign the communication terminal apparatus notifying the allocation refusal channel number to the channel indicated by the allocation refusal channel number.

Thus, the scheduler section is capable of avoiding assigning the communication terminal apparatus notifying an allocation refusal channel to the allocation refusal channel. It is thereby possible to prevent scheduling to a channel with poor reception quality.

In one aspect of the communication control apparatus according to the invention, the scheduler section is characterized by judging a priority of transmission data, and earlier allocating a channel to a communication terminal apparatus that is a destination of transmission data having a higher priority.

Thus, the scheduler section is capable of determining the order of the communication terminal apparatuses undergoing scheduling based on the priority of the transmission data.

In one aspect of the communication control apparatus according to the invention, the scheduler section is characterized by judging a priority of transmission data, and determining the number of selectable channels to allocate to a communication terminal apparatus that is a destination of the transmission data corresponding to the priority.

Thus, the scheduler section is capable of determining a selectable channel based on the priority of transmission data. It is thereby possible to adjust communication circumstance of the entire system corresponding to the priority of data.

In one aspect of the communication control apparatus according to the invention, features are that a statistical processing section is further provided which updates the number of selectable channels of each communication terminal apparatus based on the number of channels allocated to each communication terminal apparatus by the scheduler section, and the number of selection channels notified from each communication terminal apparatus, and that the transmitting section transmits the updated number of selectable channels to each communication terminal apparatus.

Thus, the statistical processing section is capable of updating the number of selectable channels based on the number of channels actually allocated to the communication terminal apparatus, and the number of selection channels notified from the communication terminal apparatus. It is thereby possible to vary the number of selection channels for the communication terminal apparatus to select, corresponding to the communication status.

In one aspect of the communication control apparatus according to the invention, the statistical processing section is characterized by changing the number of selectable channels to increase for the communication terminal apparatus with a high ratio of the number of allocated channels to the number of selection channels, while changing the number of selectable channels to decrease for the communication terminal apparatus with such a ratio being low.

Thus, the statistical processing section is capable of changing the number of selectable channels corresponding to the ratio of the number of allocated channels to the number of selection channels.

In one aspect of the communication control apparatus according to the invention, a feature is a further provided modulation parameter selecting section that selects a modulation parameter for specifying at least one of a modulation scheme and a coding rate for each of a plurality of frequency channels, based on the reception quality information received from the communication terminal apparatus.

Thus, the modulation parameter selecting section is capable of selecting a modulation parameter based on the reception quality information notified from each of the communication terminal apparatuses.

In one aspect of the communication control apparatus according to the invention, features are that the receiving section receives reception quality information further including an average measurement result obtained by averaging a plurality of reception quality measurement results of each communication terminal apparatus, the scheduler section assigns each communication terminal apparatus to a channel that is not selected as the selection channel by any communication terminal apparatus based on the average measurement result, and that the modulation parameter selecting section selects a modulation parameter for the channel that is not selected as the selection channel by any communication terminal apparatus based on the average measurement result.

Thus, modulation parameter selecting section is capable of selecting a modulation parameter for a channel that is not selected as the selection channel by any communication terminal apparatus based on the average measurement result.

In one aspect of the communication control apparatus according to the invention, the scheduler section is characterized by dividing the channel that is not selected as the selection channel by the communication terminal apparatus into a plurality of sub-channels, and assigning a plurality of communication terminal apparatuses to the plurality of divided sub-channels.

Thus, for the channel that is not selected as the selection channel by any communication terminal apparatus, the scheduler section is capable of dividing the channel into a plurality of sub-channels to assign a plurality of communication terminal apparatuses. Frequency diversity can thereby be obtained.

An aspect of a communication system according to the invention is a communication system where communications are performed between a communication control apparatus and a communication terminal apparatus using a plurality of channels, and is characterized in that the communication terminal apparatus is provided with a terminal-side receiving section that receives a control signal from the communication control apparatus, a reception quality measuring section that measures reception quality of each channel based on the received control signal, a reception quality information generating section which selects part of channels as selection channels from the plurality of channels based on measured reception quality measurement results, and generates reception quality information to notify the communication control apparatus of reception quality measurement results in the selected selection channels, and a terminal-side transmitting section that transmits the generated reception quality information to the communication control apparatus, and that the communication control apparatus is provided with a control-side receiving section that receives the reception quality information in the selection channels from the communication terminal apparatus, a scheduler section that selects at least one channel from the selection channels based on the reception quality information, and a control-side transmitting section that assigns transmission data of which destination is the communication terminal apparatus to the selected channel to transmit.

Thus, according to one aspect of the communication system according to the invention, the communication terminal apparatus is capable of selecting part of frequency channels from all the frequency channels, and notifying the communication control apparatus of the reception quality information of selected frequency channels. As compared with the case of notifying the reception quality information of all the frequency channels, it is possible to suppress control information amounts, and to reduce overhead due to notification of the control information. Further, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality.

An aspect of a communication method according to the invention is a communication method of a communication terminal apparatus that performs communications with a communication control apparatus using a plurality of channels, and is characterized in that a control signal is received from the communication control apparatus, reception quality of each of the channels is measured based on the received control signal, part of channels are selected as selection channels from the plurality of channels based on measured reception quality measurement results, reception quality information is generated to notify the communication control apparatus of reception quality measurement results in the selected selection channels, and that the generated reception quality information is transmitted to the communication control apparatus.

Thus, according to one aspect of the communication method, the communication terminal apparatus is capable of selecting part of frequency channels from all the frequency channels, and notifying the communication control apparatus of the reception quality information of selected frequency channels. As compared with the case of notifying the reception quality information of all the frequency channels, it is possible to suppress control information amounts, and to reduce overhead due to notification of the control information.

An aspect of the communication method according to the invention is a communication method of a communication control apparatus that performs communications with a communication terminal apparatus using a plurality of channels, and is characterized in that reception quality information is received from the communication terminal apparatus to notify reception quality of selection channels obtained by selecting part of channels from the plurality of channels, at least one channel is selected from the selection channels based on the reception quality information, and that the transmission data of which destination is the communication terminal apparatus is assigned to the selected channel to transmit.

Thus, according to one aspect of the communication method according to the invention, the communication terminal apparatus selects part of frequency channels from all the frequency channels, and it is possible to acquire the reception quality information of the selected frequency channels. As compared with the case of notifying the reception quality information of all the frequency channels, it is possible to suppress control information amounts, and to reduce overhead due to notification of the control information. The communication control apparatus assigns the frequency channels selected by the communication terminal apparatus, and is thereby capable of allocating frequency channels with good reception quality.

An aspect of a communication method according to the invention is a communication method where communications are performed between a communication control apparatus and a communication terminal apparatus using a plurality of channels, and is characterized in that the communication terminal apparatus receives a control signal from the communication control apparatus, measures reception quality of each of the channels based on the received control signal, selects part of channels as selection channels from the plurality of channels based on measured reception quality measurement results, and generates reception quality information to notify the communication control apparatus of reception quality measurement results in the selected selection channels, and transmits the generated reception quality information to the communication control apparatus, and that the communication control apparatus receives the reception quality information in the selection channels from the communication terminal apparatus, selects at least one channel from the selection channels based on the reception quality information, and assigns transmission data of which destination is the communication terminal apparatus to the selected channel to transmit.

Thus, according to one aspect of the communication method according to the invention, the communication terminal apparatus is capable of selecting part of frequency channels from all the frequency channels, and notifying the communication control apparatus of the reception quality information of selected frequency channels. As compared with the case of notifying the reception quality information of all the frequency channels, it is possible to suppress control information amounts, and to reduce overhead due to notification of the control information. Further, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality.

The invention has advantageous effects. According to the invention, it is possible to perform scheduling for improving throughput, while suppressing control information amounts notified from communication terminal apparatuses to the communication control apparatus.

BRIEF DESCRIPTION OF THE DRAWINGS

FIG. 7 is a diagram showing an example of reception quality information notified to the base station from a mobile station A;

FIGS. 8A to 8C are diagrams showing an example of the process of scheduling in the base station, where FIG. 8A shows an example of CINR level distribution in the selection channels notified from respective mobile stations, FIG. 8B is a diagram where an example of a result of execution of the allocation of frequency channels selected as selection channels in a plurality of mobile stations is added to FIG. 8A, and FIG. 8C is a diagram where an example of assigning data of which destination is a mobile station with hither average value is added to FIG.

FIGS. 9A to 9C are diagrams showing an example of the process of selecting selection channels in a mobile station D, where FIG. 9A is a diagram showing a CINR measurement value and CINR level, FIG. 9B is a diagram showing the CINR level (selection CINR level) of the selected selection channel and a value of the average CINR level, and FIG. 9C is a diagram showing an example of uplink reception quality information;

FIG. 12 is a diagram showing an example of descriptions of the CINR information (allocation CINR information) in the allocated frequency channel;

FIGS. 13A to 13D are diagrams showing an example of the process of selecting selection channels in a mobile station E using the allocation CINR information, where FIG. 13A is a diagram showing the CINR measurement value and CINR level, FIG. 13B is a diagram showing an example of the CINR information in the frequency channels allocated to a plurality of mobile stations, FIG. 13C is a diagram showing a value of the CINR difference of a frequency channel that is allocated last time, and FIG. 13D is a diagram showing a value of the CINR difference of a frequency channel that is not allocated last time;

FIG. 16A is a diagram showing the CINR measurement value and CINR level, FIG. 16B is a diagram showing selection channels and allocation refusal channels, and FIG. 16C is a diagram showing an example of reception quality information;

DETAILED DESCRIPTION OF ILLUSTRATIVE EMBODIMENTS

Embodiments of the invention will be described below with reference to accompanying drawings.

First Embodiment

Figure 1:
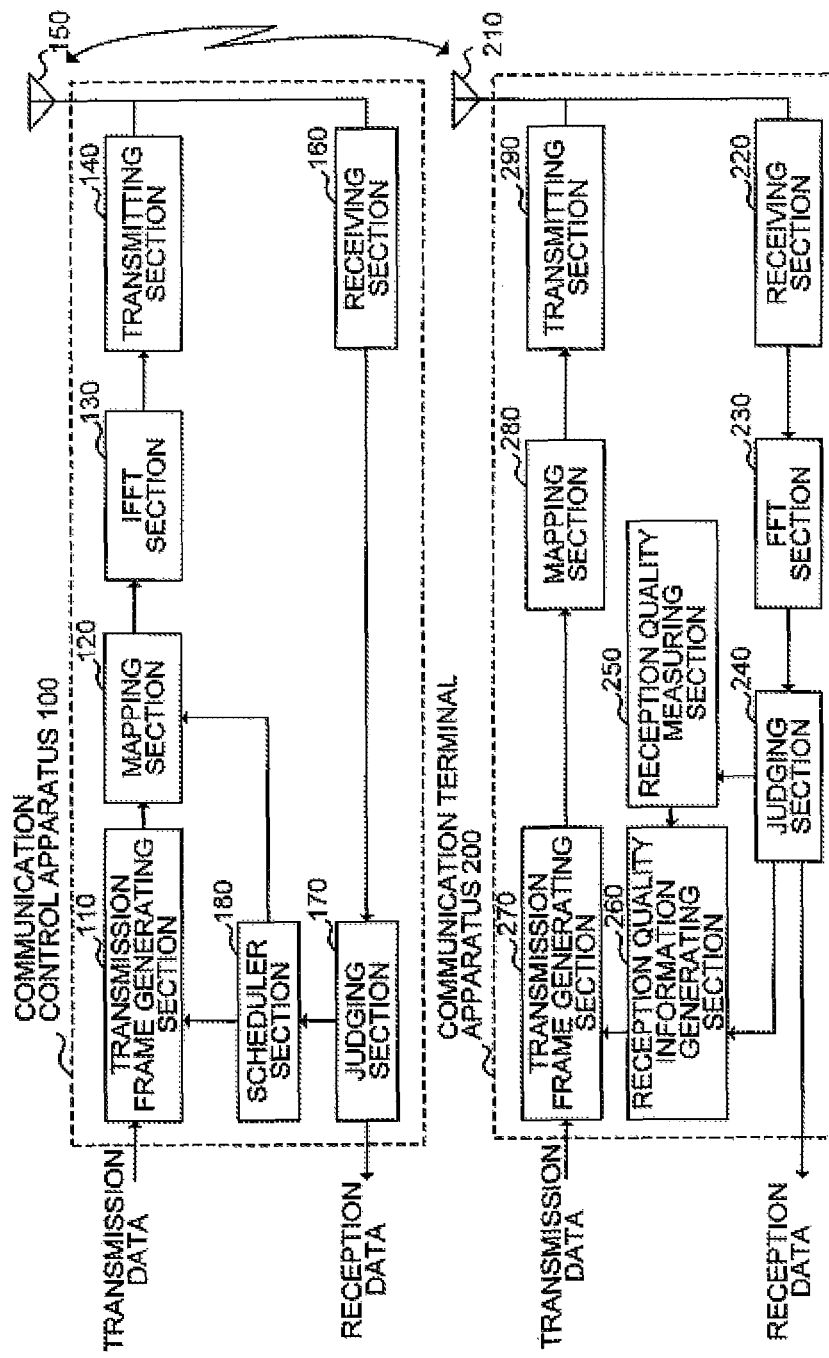
FIG. 1 is a block diagram showing a configuration example of an OFDMA system of the first embodiment according to the invention.

FIG. 1 is a block diagram showing a configuration example of a wireless communication system of the first embodiment according to the invention. In the following descriptions of each embodiment, the case will be described where CINR (Carrier-to-Interference plus Noise power Ratio) is used as reception quality, but other indexes are applicable as the reception quality. For example, indexes indicating the reception quality associated with received signal power and/or carrier power may be used such as RSSI (Receive Signal Strength Indication), SNR (Signal to Noise power Ration), SIR (Signal to Interference power Ratio), SINR (Signal to Interference plus Noise power Ration), CNR (Carrier to Noise power Ratio), CIR (Carrier to Interference power Ratio) and the like. Alternately, indexes indicating the reception quality associated with success or failure of reception may be used such as BER (Bit Error Rate), PER (Packet Error Rate), BLER (Block Error Rate) and the like. Further, in this embodiment, a frequency channel means one or a plurality of subcarriers, and explanations are made on scheduling in a plurality of frequency channels, but the channel to which the invention is applicable is not limited to the frequency channel. For example, in a system in which communications are performed using a plurality of channels such as a plurality of channels indicated by characteristic mode in SDMA (Space Division Multiple Access), channel as a combination thereof, or the like, and which is a system having the possibility that reception quality varies for each channel, the same scheduling can be performed. Further, a frame means a transmission unit.

It is assumed that the wireless communication system as shown in FIG. 1 is an OFDMA system, a communication control apparatus 100 is a base station, and that a communication terminal apparatus 200 is a mobile station, but the invention is not limited thereto. For two communication apparatuses, a side (on which the reception quality notification function is performed) for notifying the reception quality information is assumed to be the communication terminal apparatus, and a side (on which the allocation function is performed) for allocating transmission data to each channel based on the notified reception quality information is assumed to be the communication control apparatus. A single communication apparatus may have both the functions. In this specification, the communication apparatus is an apparatus that performs wireless communications, and includes a base station, mobile station, wireless device, portable terminal, cellular telephone and the like. The invention is applicable to communication apparatuses having the relationship such that any one of a plurality of communication apparatuses executes the allocation function, and that the other communication apparatuses execute the reception quality notification function.

The communication control apparatus 100 is provided with a transmission frame generating section 110, mapping section 120, IFFT (Inverse Fast Fourier Transform) section 130, transmitting section (control-side transmitting section) 140, antenna 150, receiving section (control-side receiving section) 160, judging section 170, and scheduler section 180. The communication terminal apparatus 200 is provided with an antenna 210, receiving section (terminal-side receiving section) 220, FFT (Fast Fourier Transform) section 230, judging section 240, reception quality measuring section 250, reception quality information generating section 260, transmission frame generating section 270, mapping section 280, and transmitting section (terminal-side transmitting section) 290.

Each of components constituting the wireless communication system will be described along the flow of data. First described is the flow for transmitting transmission data (downlink transmission data) to the communication terminal apparatus 200 in the communication control apparatus 100.

The transmission frame generating section 110 generates a transmission frame from the transmission data (downlink transmission data) according to scheduling control information notified from the scheduler section 180. At this point, the section 110 performs channel coding according to MCS (Modulation and Coding Scheme, modulation parameter) information notified from the scheduler section 180. Further, the section 110 generates control data to notify the communication terminal apparatus of the MCS information, and multiplexes the control data into the transmission frame. At this point, the control data may be notified to the communication terminal apparatus on a different channel. Further, a control symbol may be mapped and then multiplexed. The modulation parameter (MCS) is information for specifying at least one of the modulation scheme and the coding rate.

The mapping section 120 performs mapping of the transmission frame according to the MCS control information notified from the scheduler section 180.

The IFFT section 130 performs inverse fast Fourier transform on a modulation symbol string generated in the mapping section 120, and thereby generates an OFDM signal. The transmitting section 140 transmits the OFDM signal via the antenna 150.

Described next is the flow where the communication terminal apparatus 200 receives the transmission data (downlink transmission data) transmitted from the communication control apparatus 100, and transmits transmission data (uplink transmission data) to be transmitted.

The receiving section 220 receives the OFDM signal transmitted from the communication control apparatus 100 via the antenna 210. The FFT section 230 transforms the signal into a modulation symbol of each subcarrier.

The judging section 240 demodulates and decodes the modulation symbol transformed in the FFT section 230. At this point, the judging section 240 first judges the MCS information and scheduling control information, and according to these pieces of control information, judges a data portion. A judged received signal is output to the reception quality measuring section 250 (when the need is eliminated for estimating an interference component such as SNR or the like, a signal prior to judgment, or a received signal of a known signal beforehand multiplexed in the communication control apparatus may be output).

The reception quality measuring section 250 measures the reception quality of the received signal judged by the judging section 240. In this embodiment, CINR is measured as the reception quality. The measured reception quality measurement result is notified to the reception quality information generating section 260. A specific example of the reception quality measurement result will be described later using specific examples as shown in FIGS. 7 to 9.

The reception quality information generating section 260 generates the reception quality information, based on the reception quality measurement result measured in the reception quality measuring section 250. The reception quality information is information to notify the communication-destination apparatus of the reception quality of part of channels (hereinafter, described as "selection channel") among a plurality of channels. The selection channels are obtained by selecting part of channels from a plurality of channels. Particularly, in this embodiment, the selection channels are obtained by the communication terminal apparatus 200 selecting allocation-desiring frequency channels, and are capable of playing a role of notifying the channels to the communication control apparatus 100. Accordingly, the selection channel is also referred to as a selectable channel, request channel, allocation desired channel.

Figure 2:
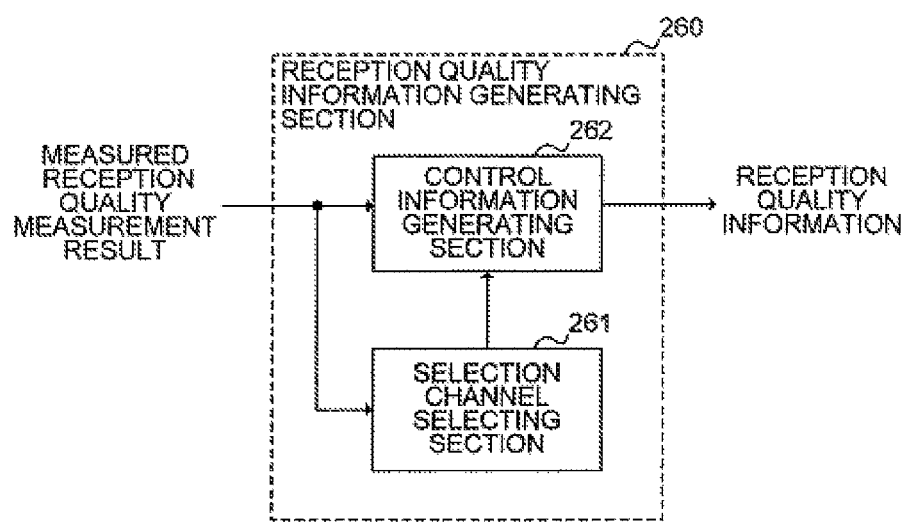
FIG. 2 is a block diagram showing an example of a configuration of a reception quality information generating section 260 of the first embodiment.
Figure 3:
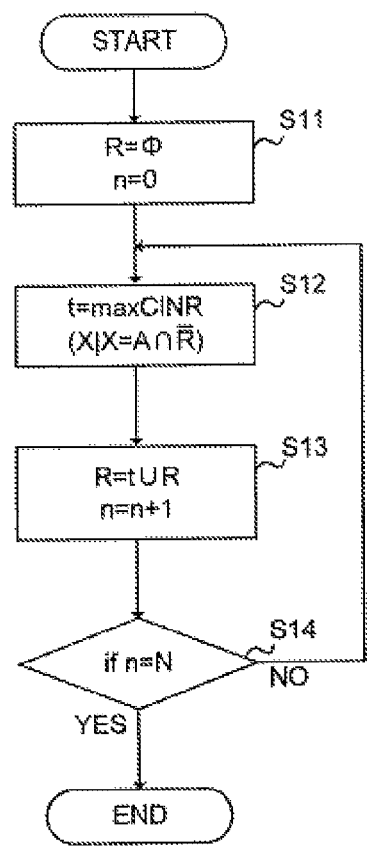
FIG. 3 is a diagram showing an example of procedures for selecting selection channels from a plurality of channels.

FIG. 2 is a block diagram showing an example of a configuration of the reception quality information generating section 260. As shown in FIG. 2, the reception quality information generating section 260 has a selection channel selecting section 261 and control information generating section 262. The selection channel selecting section 261 selects selection channels based on the reception quality notified from the reception quality measuring section 250, and notifies the channels to the control information generating section 262. FIG. 3 is a diagram showing an example of procedures (selection channel selecting procedures) for selecting selection channels from a plurality of channels. The procedures for selecting selection channels adopt a method of selecting frequency channels sequentially in descending order of CINR measured in the reception quality measuring section 250. More specifically, the procedures are explained with reference to FIG. 3.

In FIG. 3, N represents the number of selection channels, A represents a set of all the channels, R represents a set of selection channels, t represents selected channels, maxCINR (X) represents an element with the maximum CINR among the channel set X, and n represents a counter. The number of channels N is beforehand notified as the number of selectable channels from the communication control apparatus 100, and notified to the selection channel selecting section 261. In FIG. 3, as a method of determining selection channels, such a method is adopted that frequency channels are sequentially selected in descending order of CINR measured in the reception quality measuring section 250.

First, the selection channel selecting section 261 initializes R, and sets n at an initial value (step S11). The selection channel selecting section 261 selects an element with the maximum CINR among the channel set X (step S12) as t, sets R at the result of step S12, and counts up n (step S13). The selection channel selecting section 261 repeats steps S12 and S13 until n agrees with N (No in step S14), and finishes the processing when n agrees with N (Yes in step S14).

Alternately, the section 261 may select all or part of last allocated channels, and then, select selection channels using the above-mentioned selection method within the range of the number of selectable channels.

Based on the selection channels selected by the selection channel selecting section 261 and reception quality, to notify the communication control apparatus 100, the control information generating section 262 generates reception quality information including selection channel numbers (frequency channel numbers for identifying the selection channels, selection channel information) for identifying the selection channels, selection measurement results (selection CINR levels, selection reception quality information) indicating the reception quality (CINR) in the selection channels, and an average measurement result (average CINR level, average reception quality information) obtained by averaging the reception quality in all the frequency channels except the selection channels, and outputs the generated reception quality information to the transmission frame generating section 270. The selection channel number can be information for notifying the selection channel to the communication control apparatus 100 such as a channel identifier, frequency channel number or the like. The selection channel number and selection measurement result are notified in association with each other. The operation of the reception quality information generating section 260 as shown in FIG. 3 is as described above.

The transmission frame generating section 270 generates a transmission frame from transmission data (uplink transmission data). Further, the section 270 generates control information to notify the communication control apparatus 100 of the reception quality information generated in the reception quality information generating section 260, and multiplexes the resultant into the transmission frame.

The transmission frame generated in the transmission frame generating section 270 undergoes mapping in the mapping section 280, and transmitted to the communication control apparatus 100 via the transmitting section 290 and antenna 210.

Described next is the flow where the communication control apparatus 100 receives the transmission data (uplink transmission data) transmitted from the communication terminal apparatus 200.

The receiving section 160 receives the transmission data transmitted from the communication terminal apparatus 200 via the antenna 150.

The judging section 170 demodulates and decodes the transmission data received in the receiving section 160. Further, the judging section 170 separates the control information for reception quality information notification from a data portion, and outputs the reception quality information (selection channel numbers, selection measurement results and average measurement result) to the scheduler section 180.

Figure 4:
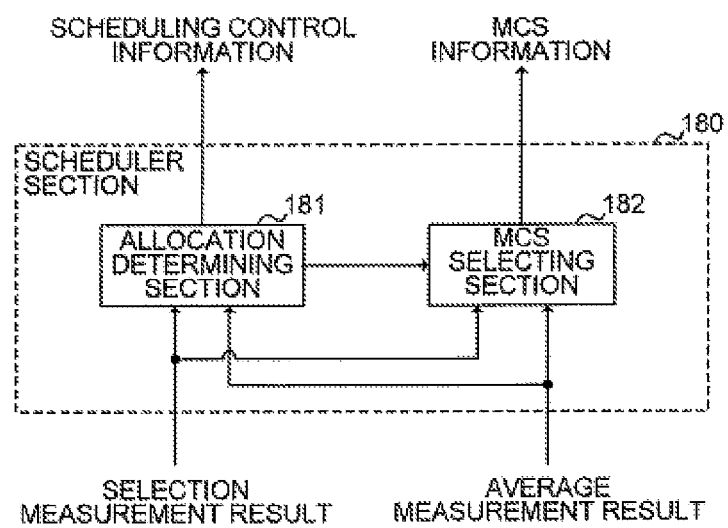
FIG. 4 is a block diagram showing an example of a configuration of a scheduler section in the first embodiment.

Based on the reception quality information notified from each communication terminal apparatus 200, the scheduler section 180 selects communication terminal apparatuses 200 to assign in all the channels, and notifies the transmission frame generating section 110 of the communication terminal apparatus 200 assigned to each channel and MCS information. FIG. 4 is a block diagram showing an example of a configuration of the scheduler section 180. The scheduler section 180 has an allocation determining section 181 and MCS selecting section (modulation parameter selecting section) 182.

Figure 5:
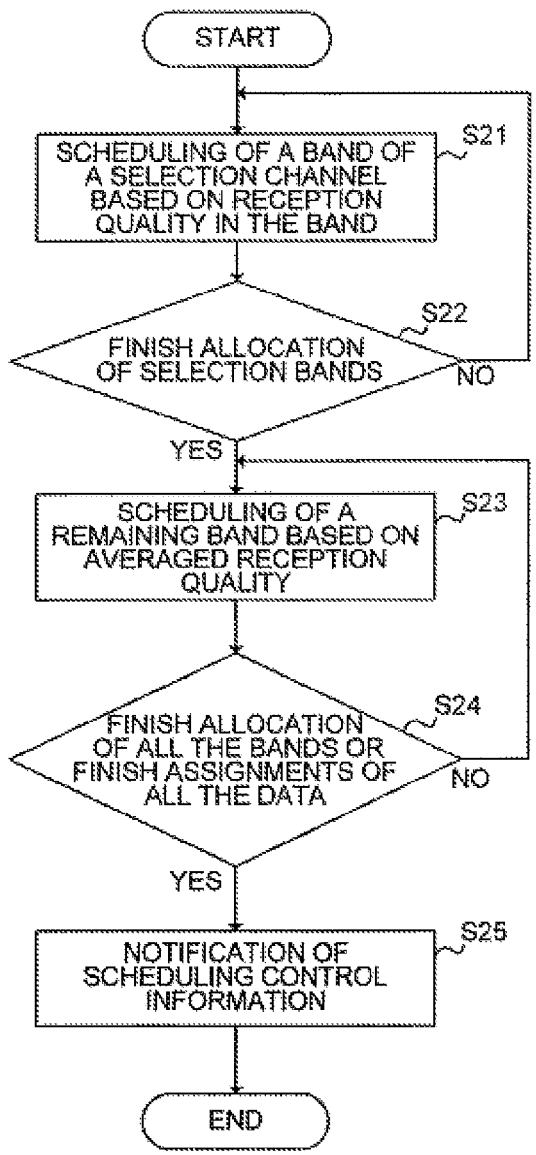
FIG. 5 is a flowchart showing an example of the operation of an allocation determining section in the first embodiment.

Based on the selection measurement results, the allocation determining section 181 determines communication terminal apparatuses 200 to assign in all the channels. FIG. 5 is a flowchart showing an example of the operation of the allocation determining section 181. The allocation determining section 181 compares the selection measurement results in the selection channels from each communication terminal apparatus 200 with one another, and assigns data of which destination is the communication terminal apparatus 200 with the highest reception quality to a band (band of the frequency channel) that is selected as the selection channel by at least one communication terminal apparatus 200 (step S21). In addition, as scheduling on the selection channels, the same technique as in conventional scheduling is used, and various techniques can be used. Herein, the maximum CINR method is adopted as an example, and as well as the method, the proportional fairness method and the like can be used. When a band that is not allocated remains among bands notified as the selection channels (step S22), step S21 is repeated. When the allocation of the bands notified as the selection channels is finished (Yes in step S22), the processing flow shifts to step S23.

Next, for the frequency channel that is not notified as the selection channel from any communication terminal apparatus 200, such a channel is allocated based on the average measurement result notified from each communication terminal apparatus 200. As allocation procedures, last assigned communication terminal apparatus 200 may be assigned preferentially, or arbitrary frequency channels are allocated in the predetermined order of communication terminal apparatuses as in RR (Round Robin) (step S23). Until allocation of all the bands is finished, or allocation of all the data is finished, step S23 is repeated (No in step S24). When the allocation determining section 181 completes allocation of each frequency channel or each data (Yes in step S24), the section 181 notifies scheduling control information indicating the allocation to each band (each frequency channel) to the MCS selecting section 182 and transmission frame generating section 110 (step S25).

According to the scheduling control information notified from the allocation determining section 181, the MCS selecting section 182 selects MCS of the data to be transmitted to each of assigned communication terminal apparatuses 200 based on the reception quality information of the assigned communication terminal apparatuses in respective allocated channels, and outputs the MCS control information to the transmission frame generating section 110 and mapping section 120.

Figure 6:
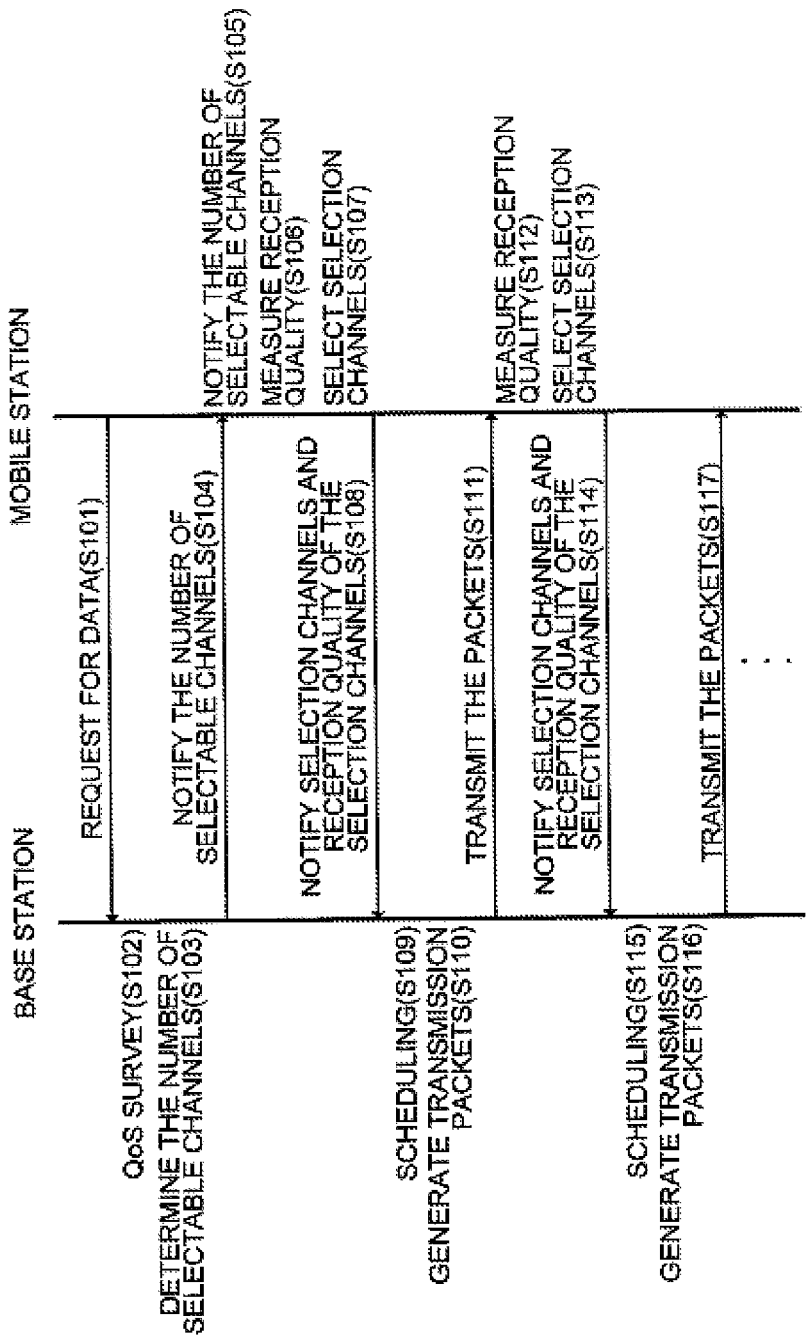
FIG. 6 is a sequence diagram snowing an example of data transmission and reception between a base station and a mobile station in the first embodiment.

A specific manner of transmission and reception of data is described herein using a base station that is an example of the communication control apparatus 100 and a mobile station that is an example of the communication terminal apparatus 200. FIG. 6 is a sequence diagram snowing an example of data transmission and reception between the base station and the mobile station in the first embodiment. The mobile station requests data such as control information including the number of selection channels and the like (step S101). The base station performs a QoS (Quality of Service) survey (step S102), determines the number of selection channels based on the transmission data requested to the scheduler section 180 (based on the QoS such as the amount, priority and the like) (step S103), and notifies the number of selectable channels (step S104). The mobile station notifies (sets) the selection channel selecting section 261 of (at) the number of selectable channels (step S105), the reception quality measuring section 250 measures the reception quality (step S106), and the reception quality information generating section 260 selects selection channels, and generates the reception quality information (step S107). The mobile station notifies the base station of the generated reception quality information (selection channels and reception quality of the selection channels) (step S108).

In the base station, the scheduler section 180 performs scheduling (step S109), transmission frame generating section 110 and the like generate transmission packets (step S110), and the generated transmission packets are transmitted to the mobile station (step S111). Based on the number of selectable numbers last notified (step S105), the mobile station measures the reception quality (step S112), selects selection channels (step S113), and notifies the reception quality information (step S114). Subsequent operations are repetitions of the foregoing and omitted.

The function and operation of each component are described above. Since the communication terminal apparatus 200 is required to notify the communication control apparatus 100 only of the reception quality information in the selection channels, as compared with the case of notifying the reception quality information of all the frequency channels, overhead due to control information notification is reduced on uplink.

Using specific examples, described next are the method of selecting selection channels in the mobile station (that is an example of the communication terminal apparatus 200) and the scheduling method in the base station (that is an example of the communication control apparatus 100).

The scheduling method in the base station will be described first. FIG. 7 is a diagram showing an example of the reception quality information notified to the base station from a mobile station A. FIG. 7 shows an example of uplink reception quality information in the case where the mobile station A notifies two frequency channels as selection channels. The mobile station notifies information of Ch2 and Ch5 (selection channel numbers) that are frequency channel numbers (channel identifiers) for identifying the frequency channels selected as the selection channels, "2" and "8" that are CINR levels (selection CINR levels) in respective frequency channels, and "2" that is an average CINR level. Herein, the CINR level is a value obtained by quantizing a CINR measurement value that is measured reception quality. Similarly, the base station is notified of the reception quality information from each mobile station. Such a manner is shown in FIGS. 8A to 8C.

FIGS. 8A to 8C are diagrams showing an example of the process of scheduling in the base station. FIGS. 8A to 8C show the case where the base station is notified of the reception quality information from three mobile stations, A, B and C. In FIGS. 8A to 8C, the vertical axis represents the CINR value (value of the CINR level), and the horizontal axis represents the frequency (frequency channel number). Further, in FIGS. 8A to 8C, different kinds of lines are used to distinguish between mobile stations to represent data, while the solid line represents data associated with the mobile station A, the dashed line represents data associated with the mobile station B, and the dotted line represents data associated with the mobile station C.

FIG. 8A shows an example of CINR level distribution in the selection channels notified from respective mobile stations. The mobile station A notifies Ch2 and Ch5 as the selection channels, the mobile station B notifies Ch3 and Ch5 as the selection channels, and the mobile station C notifies Ch6 and Ch7 as the selection channels. Ch5 is selected by two mobile stations, A and B. First, the base station assigns a mobile station in each requested selection channel (step S21 and step S22 in FIG. 5). At this point, a frequency channel that is requested from only one mobile station is allocated to data of which destination is the mobile station. Further, in the case where a plurality of mobile stations requests the same frequency channel, the base station allocates the frequency channel to data of which destination is a mobile station with the best reception quality, i.e. a mobile station with the highest CINR level. Alternately, while allocating the channel to a mobile station with good reception quality, the base station preferentially assigns data of which destination is the mobile station last assigned to the frequency channel. The allocation of the frequency channel is performed in such a method. Herein, the base station allocates Ch5 to the mobile station A.

FIG. 8B is a diagram where an example of a result of execution of the allocation of frequency channels selected as selection channels in a plurality of mobile stations is added to FIG. 8A. Ch2, Ch3, Ch5, Ch6 and Ch7 are frequency channels of which allocation is determined, while Ch1, Ch4 and Ch8 are frequency channels of which allocation is not determined.

Next, the allocation is performed on the frequency channels that are not selected from any mobile stations (step S23 and step S24 in FIG. 5). For example, a frequency channel that is not selected is preferentially allocated to data of which destination is a mobile station with high average CINR. FIG. 8C is a diagram where an example of sequentially assigning data of which destination is a mobile station with hither average value is added to FIG. 8B. FIG. 8C shows a manner where the allocation of all the frequency channels is determined. Each of arrows of the solid line, dashed line and dotted line on the right side shows a value of the average CINR level of the respective mobile station. It is considered that a mobile station with a high average value of the reception quality has a high possibility that the reception quality in the frequency channel is relatively good. Alternately, the frequency channel that is not selected is preferentially allocated to data of which destination is the mobile station that is assigned to the channel last time. This is because it is considered that the last assigned mobile station has a high possibility that the reception quality in the frequency channel is relatively good. Further, the frequency channel is allocated based on a factor such that the frequency channel is not used, the power can efficiently be used, interference can be suppressed, or the like. The number of frequency channels to allocate to a mobile station is determined by the data amount and the like.

Described next is the method of selecting selection channels in the mobile station. FIGS. 9A to 9C are diagrams showing an example of the process of selecting selection channels in a mobile station D. The reception quality measuring section 250 in the mobile station D measures the reception quality (CINR), and quantizes the measured CINR measurement value to calculate a CINR level. FIG. 9A is a diagram showing the CINR measurement value and CINR level. The dashed line shows the CINR measurement value obtained by the reception quality measuring section 250 measuring CINR (reception quality), and each of the solid lines shows a value of the CINR level obtained by quantizing the CINR measurement value for each frequency channel. In the mobile station D, the selection channel selecting section 261 of the reception quality information generating section 260 compares the CINR level in each measured frequency channel with one another as shown in FIG. 9A, and thereby selects frequency channels to select as selection channels. The selection channel selecting section 261 sequentially selects frequency channels with higher CINR in the range of the number of selectable channels beforehand notified from the base station. Using the result of selection of the selection channel selecting section 261, the control information generating section 262 generates selection CINR levels (selection measurement results) of the selection channels, and the average CINR level (average measurement result). FIG. 9B is a diagram showing the CINR level (selection CINR level) of the selected selection channel and a value of the average CINR level. Each of the solid lines shows a value of the CINR level in the selected selection channel, and the dashed line shows a value of the average CINR level. Further, the control information generating section 262 generates the reception quality information, and the generated reception quality information is notified to the base station. FIG. 9C is a diagram showing an example of uplink reception quality information. The structural elements of FIG. 9C are the same as in FIG. 7.

Thus, according to this embodiment, the communication terminal apparatus is capable of selecting part of frequency channels from all the frequency channels, and notifying the communication control apparatus of the reception quality information of selected frequency channels. As compared with the case of notifying the reception quality information of all the frequency channels, it is possible to suppress control information amounts, and to reduce overhead due to notification of the control information. Further, since the communication terminal apparatus notifies the communication control apparatus of the reception quality information with good reception quality, it is possible to notify the communication control apparatus of the frequency channels with good reception quality. The communication control apparatus assigns the frequency channels selected in the communication terminal apparatus, and is thereby capable of allocating the frequency channels with good reception quality. Further, since the communication control apparatus notifies the communication terminal apparatus of the number of selectable channels, it is possible on the communication control apparatus side to adjust reception quality information amounts notified from the communication terminal apparatus corresponding to the communication status.

In addition, this embodiment describes the case that the reception quality information includes the selection channel number (frequency channel number), selection measurement result and the average measurement result, but the reception quality information may be information including at least the selection measurement result. Further, the average measurement result is calculated by averaging the reception quality in all the frequency channels except the selection channels, but may use a value calculated by averaging the reception quality in all the frequency channels including the selection channels.

Second Embodiment

The second embodiment describes an aspect that the communication control apparatus notifies the communication terminal apparatus of the last reception quality information. An OFDMA system of this embodiment uses the same configuration as in FIG. 1. Respects differing from the first embodiment will be focused below to explain. The components assigned the same reference numerals and names as those in FIG. 1 have the same functions.

In the communication control apparatus 100, the transmission frame generating section 110 generates a transmission frame from the transmission data according to the scheduling control information notified from the scheduler section 180. At this point, the section 110 performs channel coding according to the MCS information notified from the scheduler section 180. Further, in addition to the control data to notify the communication terminal apparatus 200 of the MCS information, the section 110 generates the control data to notify the communication terminal apparatus 200 of the scheduling control information, and the control data to notify each communication terminal apparatus 200 of the reception quality information (allocation measurement result, allocation CINR level) in the frequency channels allocated to each communication terminal apparatus 200, and multiplexes the control data into the transmission frame. The allocation measurement result is a reception quality measurement result measured by a communication terminal apparatus assigned to each channel.

The mapping section 120 performs mapping of the transmission frame according to the MCS control information notified from the scheduler section 180.

The IFFT section 130 performs inverse fast Fourier transform on a modulation symbol string generated in the mapping section 120, and thereby generates an OFDM signal. The OFDM signal is transmitted via the transmitting section 140.

In the communication terminal apparatus 200, the receiving section 220 receives the OFDM signal transmitted from the communication control apparatus 100, the FFT section 230 transforms into a modulation symbol of each subcarrier, and then, the judging section 240 demodulates and decodes the symbol. At this point, the judging section 240 first judges the MCS information and scheduling control information, and according to these pieces of control information, judges a data portion. A judged received signal is output to the reception quality measuring section 250 (when the need is eliminated for estimating an interference component such as SNR or the like, a signal prior to judgment may be output). The reception quality measuring section 250 measures the reception quality (CINR) based on the received signal, and notifies the measured reception quality measurement result to the reception quality information generating section 260. Further, the judging section 240 separates the control data (allocation measurement result) which is notified from the base station to notify the reception quality information in the frequency channels allocated to each communication terminal apparatus 200, and outputs the control data to the reception quality information generating section 260.

Figure 10:
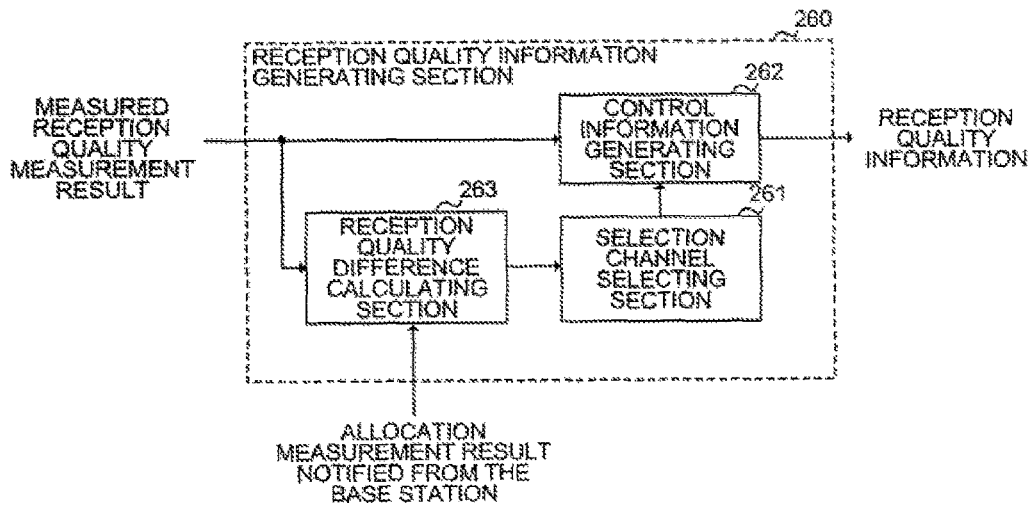
FIG. 10 is a block diagram showing an example of a configuration of a reception quality information generating section of the second embodiment.

The reception quality information generating section 260 will be described next. FIG. 10 is a block diagram showing an example of a configuration of the reception quality information generating section 260 of this embodiment. As shown in FIG. 10, the reception quality information generating section further has a reception quality difference calculating section 263, in addition to the selection channel selecting section 261 and control information generating section 262 as shown in FIG. 2.

The reception quality difference calculating section 263 compares the allocation measurement result notified from the communication control apparatus 100 with the reception quality measurement result (CINR level) measured by the reception quality measuring section 250, and calculates a reception quality difference (CINR difference) in each channel to notify the selection channel selecting section 261. For example, the reception quality difference calculating section 263 calculates, as the reception quality difference, either a difference between the measured reception quality measurement result and the allocation measurement result or a ratio between the measured reception quality measurement result and the allocation measurement result. More specifically, the reception quality difference may be a difference obtained by subtracting the allocation measurement result from the reception quality measurement result measured by the communication terminal apparatus. Alternately, the reception quality difference may be a ratio obtained by dividing the reception quality measurement result measured by the communication terminal apparatus by the allocation measurement result. The reception quality difference calculating section 263 can use other calculation methods which are methods for calculating as the reception quality difference a relative value of the degree by which the reception quality indicated by the reception quality measurement result measured by the communication terminal apparatus is higher or lower than the allocation measurement result.

Based on the reception quality difference notified from the reception quality difference calculating section 263, the selection channel selecting section 261 selects selection channels to notify the control information generating section 262. For example, the selection channel selecting section 261 selects, as selection channels, channels corresponding to the number of selectable channels in descending order of the reception quality difference (in descending order of excellence of the reception quality measurement result of the communication terminal apparatus). Alternately, the selection channel selecting section 261 selects, as selection channels, channels with the calculated reception quality difference larger than a predetermined threshold. Further, the section 261 assigns a priority to a channel that is allocated to the communication terminal apparatus last time to select as the selection channel among the channels with the calculated reception quality difference larger than the predetermined threshold. The selection channel selecting section 261 outputs the selection channels, selection measurement results (selection CINR levels) indicating the reception quality in the selection channels, and the average measurement result (average CINR level) obtained by averaging the reception quality to the control information generating section 262.

The control information generating section 262 generates the reception quality information including the selected selection channel numbers, selection measurement results in the selection channels, and the average measurement result each to be notified to the communication control apparatus 100, and outputs the generated information to the transmission frame generating section 270.

The transmission frame generating section 270 generates a transmission frame from the transmission data. Further, the section 270 generates the control information to notify the communication control apparatus 100 of the reception quality information generated in the reception quality information generating section 260, and multiplexes the resultant into the transmission frame (the data may be notified to the base station on different channels, or a notification symbol may be mapped and then multiplexed).

The transmission frame generated in the transmission frame generating section 270 undergoes mapping in the mapping section 280, and is transmitted to the communication control apparatus 100 via the transmitting section 290.

In the communication control apparatus 100, the receiving section 160 receives the transmission data (signal) transmitted from the communication terminal apparatus 200, and the judging section 170 demodulates and decodes the data.

The judging section 170 separates the control information to notify the reception quality information from a data portion, and outputs the reception quality information (selection channel numbers, selection measurement results and average measurement result) to the scheduler section 180.

Figure 11:
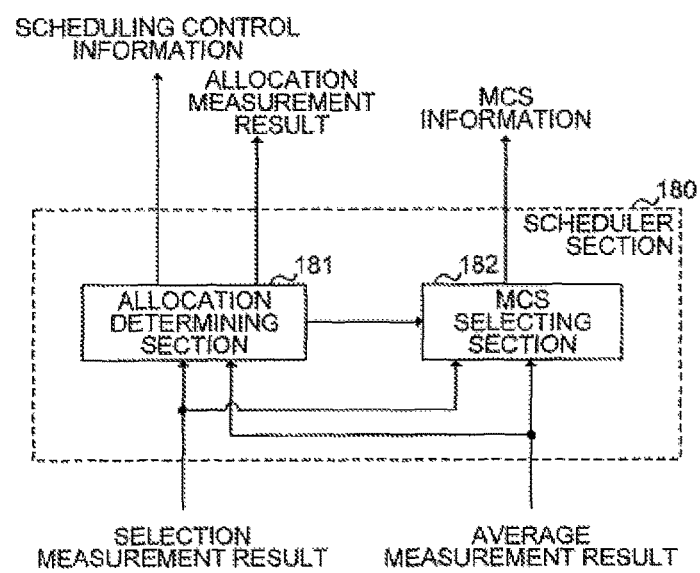
FIG. 11 is a block diagram showing an example of a configuration of a scheduler section of the second embodiment.

The scheduler section 180 will be described next. FIG. 11 is a block diagram showing an example of a configuration of the scheduler section 180 of this embodiment. The data flow differs from that in the block portion of FIG. 4. The scheduler section 180 has the allocation determining section 181 and MCS selecting section 182.

As in the first embodiment, the allocation determining section 181 performs each step of steps S21 to S24 of FIG. 5. When the allocation determining section 181 completes the allocation of all the frequency channels (Yes in step S24), the section 181 notifies the scheduling control information to the MCS selecting section 182 and transmission frame generating section 110 (step S25). Further, for all the frequency channels, the allocation determining section 181 notifies the reception quality information notified to the communication control apparatus from the communication terminal apparatus assigned to each frequency channel to the transmission frame generating section 110 as the allocation measurement result. The allocation measurement result is the reception quality measurement result (CINR level) notified to the communication control apparatus from the communication terminal apparatus assigned to each channel.

According to the scheduling control information notified from the allocation determining section 181, the MCS selecting section 182 selects MCS of the data to be transmitted to each of assigned communication terminal apparatuses 200 based on the reception quality information of the assigned communication terminal apparatuses in respective allocated channels, and outputs the MCS control information to the transmission frame generating section 110 and mapping section 120.

Described next are details on the method of selecting selection channels in the mobile station (that is an example of the communication terminal apparatus 200) with reference to a specific example. In addition, as the scheduling method in the base station (that is an example of the communication control apparatus 100), the same method can be used as the method described in the first embodiment.

When the base station determines the allocation, the allocation determining section 181 of the scheduler section 180 generates CINR information (allocation CINR information) in the allocated frequency channels. The allocation CINR information is an example of the allocation measurement result. FIG. 12 shows an example of descriptions of the CINR information in the allocated frequency channels. The base station notifies each mobile station of the information of the CINR level in each frequency channel. FIGS. 13A to 13D show examples of the process of selecting selection channels in a mobile station E using the allocation CINR information.

FIG. 13A is a diagram showing the CINR measurement value and CINR level. The dashed line shows the CINR measurement value obtained by the reception quality measuring section 250 measuring CINR (reception quality), and each of the solid lines shows a value of the CINR level obtained by quantizing the CINR measurement value for each frequency channel. FIG. 13B is a diagram showing an example of the CINR information in the frequency channels allocated to a plurality of mobile stations. Each of the solid lines shows a value of the CINR level of the frequency channel allocated to the mobile station E, and each of the doted lines shows a value of the CINR level of the frequency channel allocated to the mobile station except the mobile station E. The mobile station E is assigned frequency channels Ch2, Ch5 and Ch8, and the other frequency channels are allocated to other mobile stations.

Figure 14:
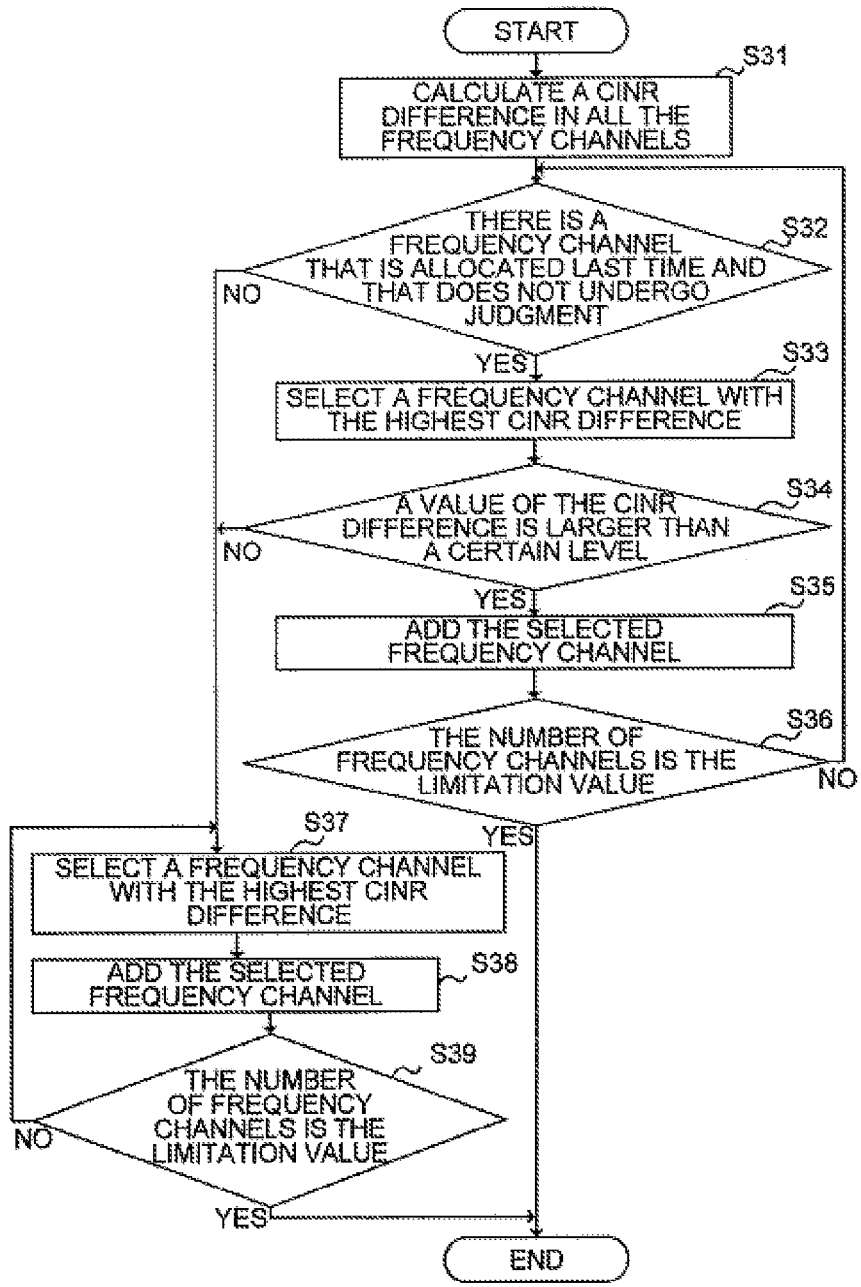
FIG. 14 is a flowchart showing an example of the operation of selecting selection channels of the second embodiment.

In the mobile station E, the reception quality information generating section 260 compares the information of the CINR level in each frequency channel notified from the base station as shown in FIG. 13B with the measured CINR level in each frequency channel as shown in FIG. 13A, and selects selection channels. FIG. 14 is a flowchart showing an example of the operation of selecting selection channels of this embodiment. The operation of FIG. 14 is based on the premise that the number of selection channels (the number of selectable channels) N is beforehand determined.

The reception quality difference calculating section 263 calculates a CINR difference by subtracting a value of the allocation CINR level from a value of the CINR level of the mobile station E for each of the frequency channels (step S31). Based on the CINR difference of the reception quality difference calculating section 263, the selection channel selecting section 261 extracts a frequency channel that is allocated to the station E last time and that does not undergo judgment of step S33 and subsequent steps (Yes in step S32), and selects a frequency channel with the highest CINR difference (i.e. an increase in the CINR level from the last time being the largest) among extracted frequency channels (step S33). When a value of the CINR difference in the selected frequency channel is larger than a certain level (Yes in step S34), the selected frequency channel is added (step S35). When a value of the CINR difference in the selected frequency channel is less than or equal to the certain level (No in step S34), the processing flow proceeds to step S37. Step S32 to step S36 are repeated until the number of selected frequency channels becomes a limitation value N, and when there is no frequency channel in step S32 that is allocated last time and that does not undergo judgment of step S33 and subsequent steps (No in step S32), the processing flow shifts to step S37.

Next, the selection channel selecting section 261 selects a frequency channel with the highest CINR difference (i.e. a value obtained by subtracting the CINR level of the station E from the CINR level of another mobile station being the largest) among frequency channels that are not allocated last time (step S37), and adds the frequency channel to selected frequency channels (step S38). Step S37 to step S39 are repeated until the number of selected frequency channel becomes the limitation value N. When the number of frequency channels selected in step S36 or step S39 reaches the limitation value N (Yes in step S36, Yes in step S39), the processing is finished.

In FIG. 14, step S32 to step S36 are processing associated with the frequency channel that is allocated last time, and step S37 to step S39 are processing associated with the frequency channel that is not allocated last time. Thus, a frequency channel that is allocated (or selected) last time is preferentially selected.

FIG. 13C is a diagram showing a value of the CINR difference of a frequency channel that is allocated last time, and FIG. 13D is a diagram showing a value of the CINR difference of a frequency channel that is not allocated last time. In FIG. 13C, the dashed line shows a level of a predetermined (certain) level.

As shown in FIG. 13C, when a value of the CINR difference is larger than a predetermined (certain) level in a frequency channel that is allocated (or selected) last time, the frequency channel is selected again (step S34 in FIG. 14). At this point, channels are selected in descending order of the CINR difference in step S33 of FIG. 14, and Ch5 is first selected in FIG. 13C. Meanwhile, Ch2 and Ch8 are not selected because their values of the CINR difference are less than the predetermined level.

As shown in FIG. 13D, in frequency channels that are not allocated last time, a difference between the CINR level based on the CINR measurement value and the CINR level notified as the allocation CINR information from the base station is calculated as the CINR difference in each of the frequency channels, and frequency channels are selected sequentially in descending order of the CINR difference.

In FIG. 13D, Ch6 and Ch1 are selected in this order. When the limitation value N of frequency channels is assumed to be two, Ch5 and Ch6 are selected in this order.

As described above, in consideration of frequency channels that are allocated last time, it is possible to prevent the selection channels from being switched every timing of notification to the communication control apparatus 100, and the load on the communication control apparatus 100 can thereby be reduced. Meanwhile, it is possible to use a method of adding frequency channels sequentially to selection channels in descending order of the CINR difference without considering whether the channel is allocated last time. At this time, the load on the communication control apparatus increases, but as compared with the method of considering the frequency channel that is allocated last time, the transmission rate increases.

Thus, in this embodiment, since the communication terminal apparatus is required to notify the communication control apparatus of the reception quality only in the selected frequency channels, overhead due to control information notification is reduced on uplink. Further, the communication control apparatus 100 notifies the reception quality information in frequency channels allocated to the communication terminal apparatus 200, the communication terminal apparatus 200 compares the notified reception quality information with the measured reception quality information, and requests frequency channels having a high possibility of being allocated to the communication control apparatus, and it is thereby possible to reduce the control information efficiently.

Third Embodiment

The third embodiment describes an aspect where the communication control apparatus selects an allocation change candidate channel, and notifies the communication terminal apparatus of the reception quality information in the allocation change candidate channel.

Figure 15:
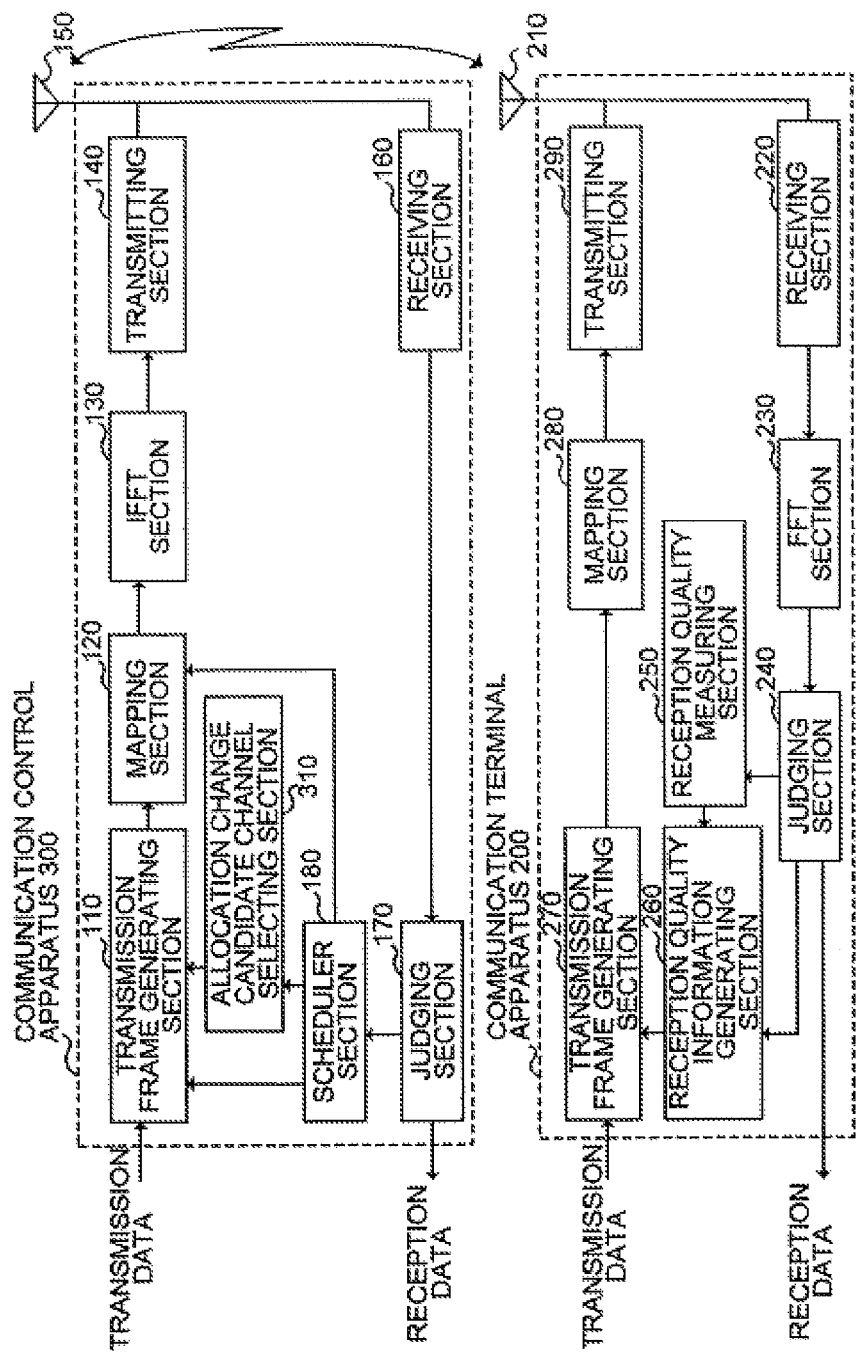
FIG. 15 is a block diagram showing a configuration example of an OFDMA system of the third embodiment.

FIG. 15 is a block diagram showing a configuration example of an OFDMA system of the third embodiment. The OFDMA system as shown in FIG. 15 is comprised of a communication control apparatus 300 and communication terminal apparatus 200, and has the components of FIG. 1 and an allocation change candidate channel selecting section 310 added to the communication control apparatus 300. Hereinafter, portions differing from FIG. 1 will be focused below to explain. The components assigned the same reference numerals and names as those in FIG. 1 have the same functions, and descriptions thereof are omitted.

The scheduler section 180 performs the operation of the data flow as shown in FIG. 11, and notifies the allocation measurement result to the transmission frame generating section 110, and further to the allocation change candidate channel selecting section 310.

The allocation change candidate channel selecting section 310 selects a channel (allocation change candidate channel) such that changing allocation to the channel is preferable (desirable), based on the allocation measurement result notified from the scheduler section 180. The allocation measurement result is the reception quality measurement result (CINR level) notified to the communication control apparatus 300 from the communication terminal apparatus 200 assigned to each channel. More specifically, the allocation change candidate channel is judged based on the CINR level and selected as described below.

The allocation change candidate channel selecting section 310 selects an allocation change candidate channel by an either method as described below, using a beforehand set threshold of the CINR level, a beforehand set number-of-channel limitation value of the allocation change candidate channel, or both of them. The threshold and number-of-channel limitation value are assumed to be held in a memory area inside the allocation change candidate channel selecting section 310. (1) Select a frequency channel with the CINR level lower than the threshold; (2) Select frequency channels with low CINR levels sequentially corresponding to the number-of-channel limitation value; and (3) Select a frequency channel with the CINR level lower than the threshold as an allocation change candidate channel, and when the number of frequency channels with the CINR level lower than the threshold is lower than the number-of-channel limitation value, select sequentially channels in ascending order of the CINR level corresponding to the number-of-channel limitation value. The allocation change candidate channel selecting section 310 outputs an allocation change candidate channel number (frequency channel number, allocation change candidate channel information) for identifying the selected allocation change candidate channel and the reception quality measurement result (CINR level) in the selected allocation change candidate channel to the transmission frame generating section 110.

Based on the information output from the allocation change candidate channel selecting section 310, the transmission frame generating section 110 generates the control information to notify the communication terminal apparatus 200 of the allocation change candidate channel number and the reception quality measurement result in the allocation change candidate channel, and multiplexes the information into a transmission frame.

The reception quality information generating section 260 compares the reception quality measurement result (CINR level measured last time by any one of communication terminal apparatuses including the apparatus 200) in the allocation change candidate channel notified from the communication control apparatus 300 with the reception quality measurement result (CINR level measured this time by the apparatus 200) in the allocation change candidate channel measured by the apparatus 200, and determines whether or not to select (request, desire) the allocation of the allocation change candidate channel. At this point, as the method of selecting selection channels, the selection method as shown in FIG. 14 in the second embodiment can be used except the respect of selecting from allocation change candidate channels. In step S31 in FIG. 14, the step of calculating the CINR difference in all the frequency channels is changed to a step of calculating the CINR difference in the allocation change candidate channels notified from the communication control apparatus 300, and the same selection method as in FIG. 4 can thereby be applied. The reception quality information generating section 260 makes the above-mentioned determination, and generates the reception quality information including a result of the above-mentioned determination.

The reception quality information generating section 260 notifies the generated reception quality information to the transmission frame generating section 270, and the transmission frame generating section 270 generates the control information to notify the communication control apparatus 300 of the reception quality information.

At this point, the reception quality information generating section 260 may generate the reception quality information further including the reception quality measurement results (last selection measurement results, last selection CINR levels) in frequency channels that are allocated last time to the communication terminal apparatus 200, in addition to the information (selection channel number) indicating a selection channel selected from the allocation change candidate channels, and the reception quality measurement result (selection measurement result, selection CINR level) in the selection channel.

Thus, in this embodiment, the communication control apparatus is capable of notifying the communication terminal apparatus of the information on allocation change candidate channels. Further, the communication terminal apparatus is capable of selecting a frequency channel of which allocation is desired from the notified allocation change candidate channels, and notifying the communication control apparatus of the channel as the selection channel. By selecting a selection channel from the change candidate channels, it is possible to make the allocation corresponding to the reception quality in the entire system. Further, by this means, it is possible to suppress downlink control information amounts and uplink information amounts. Accordingly, it is possible to perform efficient scheduling, while suppressing the downlink control information amounts and the uplink control information amounts.

Fourth Embodiment

Figure 16:
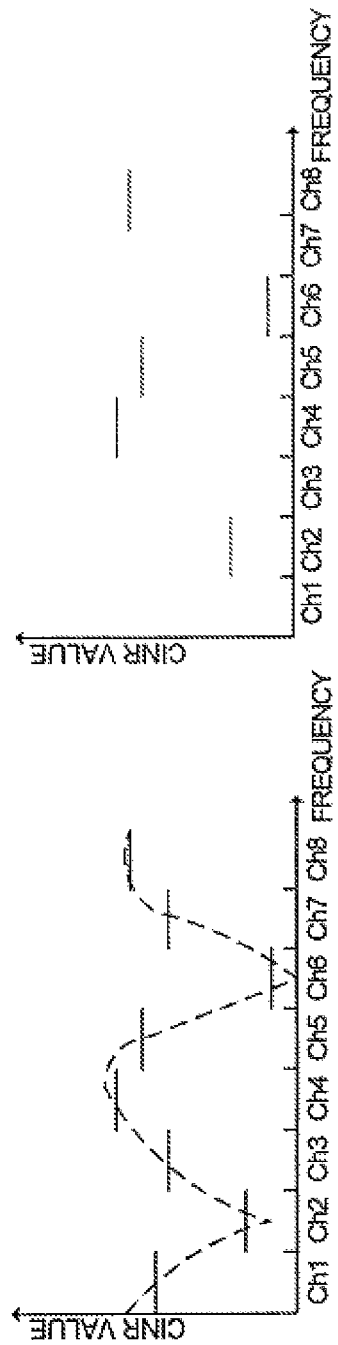
FIGS. 16A to 16C are diagrams showing an example of the process for selecting selection channels and an allocation refusal channel in a mobile station F, where

In each of the above-mentioned embodiments, the communication terminal apparatus notifies the communication control apparatus of frequency channels with good reception quality as selection channels. The fourth embodiment describes an aspect of notifying a frequency channel (allocation refusal channel) with poor reception quality. The allocation refusal channel is a channel to which the communication terminal apparatus refuses to being assigned. FIGS. 16A to 16C are diagrams showing an example of the process for selecting selection channels and an allocation refusal channel in a mobile station F. FIG. 16A is a diagram showing the CINR measurement value and CINR level. The dashed line shows the CINR measurement value, and each of the solid lines shows a value of the CINR level. FIG. 16B is a diagram showing selection channels and allocation refusal channels. Each of the solid lines shows the selection channel, and each of the doted lines shows the allocation refusal channel. FIG. 16C is a diagram showing an example of the reception quality information. As shown in FIG. 16C, in addition to selected frequency channel numbers (selection channel numbers) and selection reception quality information in the selected frequency channels, such information is notified that is associated with an allocation refusal channel number (allocation refusal channel information) for identifying a channel to which assignment is refused, i.e. the information on a frequency channel with poor reception quality. Further, the average measurement result is not shown in FIG. 16C, but may be added.

The allocation refusal channel can be selected when the selection channel selecting section selects selection channels. As the method of selecting an allocation refusal channel, there is a method for beforehand determining the number of frequency channels (refusal number M) that can be selected as the allocation refusal channels, and selecting frequency channels in ascending order of the reception quality measurement result (CINR level) within the range of the refusal number M. For the refusal number M, there are cases that M is notified from the communication control apparatus, the communication terminal apparatus sets M, a predetermined numeric value is held, and the like. Further, a method may be used for selecting a frequency channel with the reception quality measurement value (CINR level) less than a predetermined certain level. At this point, the certain level may be held at a beforehand set value, or varied corresponding to communication quality such as packet error and the like. Further, other methods may be used which are the method of making a determination using the reception quality measurement result.

The allocation determining section 181 of the communication control apparatus performs scheduling so as not to allocate a frequency channel to which a communication terminal apparatus refuses to being assigned to data of which destination is the communication terminal apparatus.

Thus, in this embodiment, since the communication terminal apparatus notifies the communication control apparatus of a frequency channel to which the communication terminal apparatus refuses to being assigned, the communication terminal apparatus can avoid from being assigned to the frequency channel with extremely poor reception quality. In each of the above-mentioned embodiments, when selection channels are not allocated, the communication control apparatus performs the allocation using the average reception quality information (average CINR level) as an index, and therefore, there is a possibility of being assigned to a frequency channel with the CINR level remarkably falling below the average CINR level. In this embodiment, by notifying an allocation refusal channel (channel of which allocation is refused) as well as frequency channels (selection channels) of which allocation is desired, the communication terminal apparatus can avoid from being assigned to a frequency channel with an extremely poor CINR level, and it is possible to perform more efficient scheduling.

Fifth Embodiment

The fifth embodiment describes an aspect of scheduling in consideration of QoS (Quality of Service) in addition to the reception quality information. This embodiment uses two classes, Real Time (RT) and Non Real Time (NRT), as an example of QoS, to explain, but the items are of an example and do not limit meaning of QoS. Further, this embodiment is explained using the OFDMA system as in FIG. 1, but is applicable to each of the above-mentioned embodiments.

Figure 17:
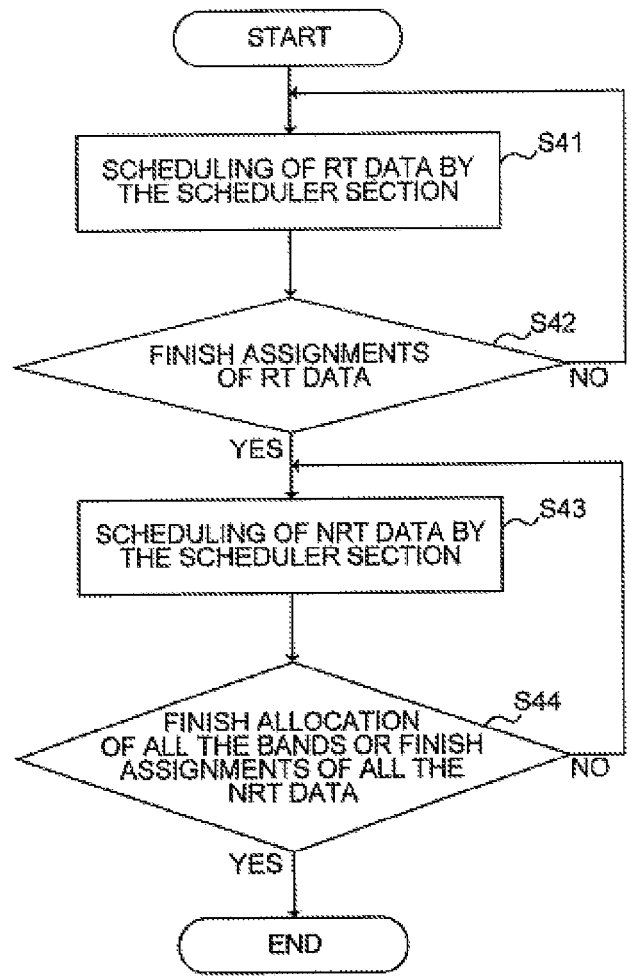
FIG. 17 is a flowchart showing an example of scheduling of the fifth embodiment.

FIG. 17 shows a flowchart showing an example of scheduling of this embodiment. The scheduler section 180 has the same internal blocks as in FIG. 4. The scheduler section 180 monitors QoS of data to assign to each frequency channel, and determines whether the data to assign is RT or NRT. As shown in FIG. 17, the scheduler section 180 preferentially assigns data of RT class to channels (step S41), and after finishing the allocation of channels to all the data of RT class (Yes in step S42), assigns data of NRT class to remaining channels (step S43). At this point, as the method of scheduling of a plurality of data of RT class or a plurality of data of NRT class, the same technique can be used as the method described in the first embodiment. In other words, frequency channels selected by communication terminal apparatuses 200 are allocated based on the selection measurement results (selection CINR levels) in the selection channels notified from the communication terminal apparatuses 200, and frequency channels that are not selected by any of communication terminal apparatuses are allocated based on the average measurement results (average CINR levels) notified from the communication terminal apparatuses 200.

Thus, in this embodiment, since channels are preferentially allocated to the data of RT class, the delay time requirements are satisfied. By this means, it is possible to perform scheduling corresponding to QoS required for the transmission data.

Sixth Embodiment

The sixth embodiment describes an aspect of the method of selecting selection channels in consideration of QoS. In this embodiment, two classes, high priorities and low priorities, are set as an example of QoS, and descriptions are made using two classes. But the classes are of an example, and do not limit meaning of QoS. For example, two or more classes may be set, or elements other than the priority may be used. This embodiment is explained using the OFDMA system as in FIG. 1, but is applicable to each of the above-mentioned embodiments.

The scheduler section 180 of the communication control apparatus 100 determines the number of selectable frequency channels as selection channels for each data from QoS of the data to transmit to the communication terminal apparatus 200, and notifies the number to the communication terminal apparatus 200. For example, settings are made so that the number of selectable frequency channels is three for high-priority data, and that the number of selectable frequency channels is one for low-priority data.

The communication terminal apparatus 200 selects frequency channels in the range of the number of frequency channels notified from the communication control apparatus 100 in requesting the frequency channels to the communication control apparatus 100. At this point, as described in the first embodiment, channels with good reception quality measurement results may be selected in the range of the number of selectable frequency channels.

Thus, in this embodiment, the number of channels allocated to high-priority data is relatively higher than the number of channels allocated to low-priority data, and QoS is thereby satisfied.

In addition, this embodiment describes the example of setting two classes on the priority, but is applicable in the case where the number of selectable frequency channels is set corresponding to QoS (for example, priority). For example, such a case is considered that the number of selectable frequency channels is set corresponding to another element of QoS, and that QoS is divided into a plurality of stages to set the number of selectable frequency channels by stage (by level), or the like.

Seventh Embodiment

The seventh embodiment describes an aspect that the communication control apparatus controls the number of frequency channels that the communication terminal apparatus notifies as selection channels, and notifies the number to the communication terminal apparatus.

In each of the above-mentioned embodiments, as shown in FIG. 6, the communication terminal apparatus requests data (step S101), the communication control apparatus notifies the number of selectable channels (step S104), and the communication terminal apparatus selects frequency channels corresponding to the notified number of selectable channels as selection channels, and notifies the selection channels and selection measurement results to the communication control apparatus (step S105 to step S108). In this embodiment, the communication control apparatus performs statistical processing based on the communication status, and controls the number of selectable channels.

Figure 18:
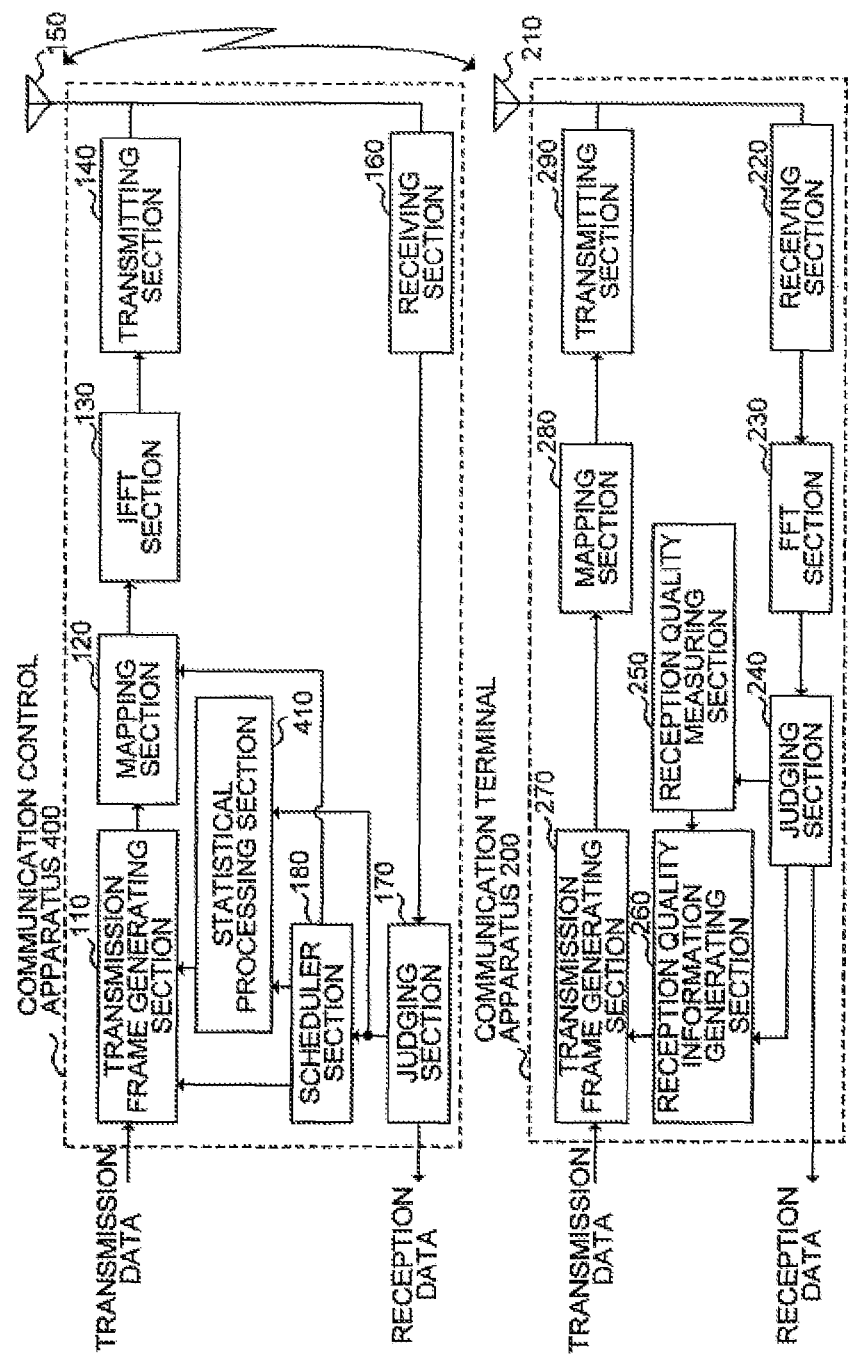
FIG. 18 is a block diagram showing a configuration example of an OFDMA system of the seventh embodiment.

FIG. 18 is a block diagram showing a configuration example of an OFDMA system of the seventh embodiment. The OFDMA system as shown in FIG. 18 is comprised of a communication control apparatus 400 and communication terminal apparatus 200, and has the components of FIG. 1 and a statistical processing section 410 added to the communication control apparatus 400. Hereinafter, portions differing from FIG. 1 will be focused below to explain. The components assigned the same reference numerals and names as those in FIG. 1 have the same functions, and descriptions thereof are omitted.

The statistical processing section 410 performs statistical processing based on the number of selection channels selected by the communication terminal apparatus 200 and channels allocated by scheduling in the scheduler section 180. Based on the number of channels allocated to each communication terminal apparatus 200 by the scheduler section 180 and the number of selection channels notified from each communication terminal apparatus 200, the statistical processing section 410 varies the number of selectable channels, specifically, so as to increase the number of selectable channels for a communication terminal apparatus 200 with a high ratio of the number of allocated channels to the number of selection channels, while decreasing the number of selectable channels for a communication terminal apparatus with a low ratio of the number of allocated channels to the number of selection channels.

Figure 19:
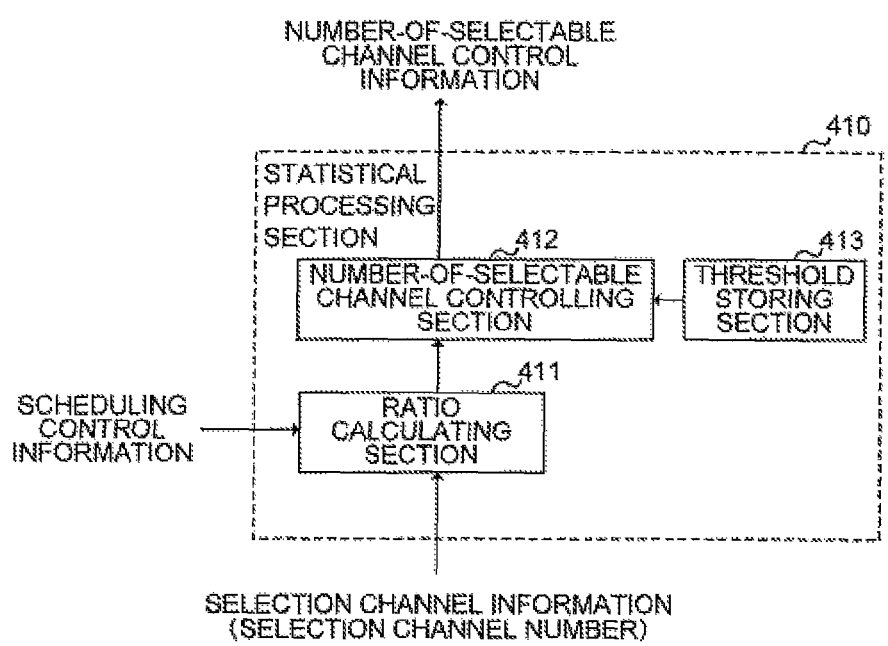
FIG. 19 is a block diagram showing an example of a configuration of a statistical processing section of the seventh embodiment.

FIG. 19 is a block diagram showing an example of a configuration of the statistical processing section 410. As shown in FIG. 19, the statistical processing section 410 has a ratio calculating section 411, number-of-selectable channel controlling section 412, and threshold storing section 413.

The ratio calculating section 411 calculates a ratio between the number of allocated channels and the number of channels allocated to the communication terminal apparatus 200, among selection channels selected by the communication terminal apparatus 200.

The number-of-selectable channel controlling section 412 controls (adjusts) the number of selectable channels based on the calculation result calculated by the ratio calculating section 411.

The threshold storing section 413 is a storage area for storing a threshold used by the number-of-selectable channel controlling section 412. The threshold is beforehand stored in the threshold storing section 413. Meanwhile, the threshold may be varied based on the calculation result by the statistical processing section 410 (ratio calculating section 411 or number-of-selectable channel controlling section 412).

Further, in the communication control apparatus 400, the scheduler section 180 (allocation determining section 181) notifies the scheduling control information to the ratio calculating section 411. Furthermore, the judging section 170 notifies the ratio calculating section 411 of selection channel numbers (frequency channel numbers of frequency channels) among the reception quality information.

Figure 20:
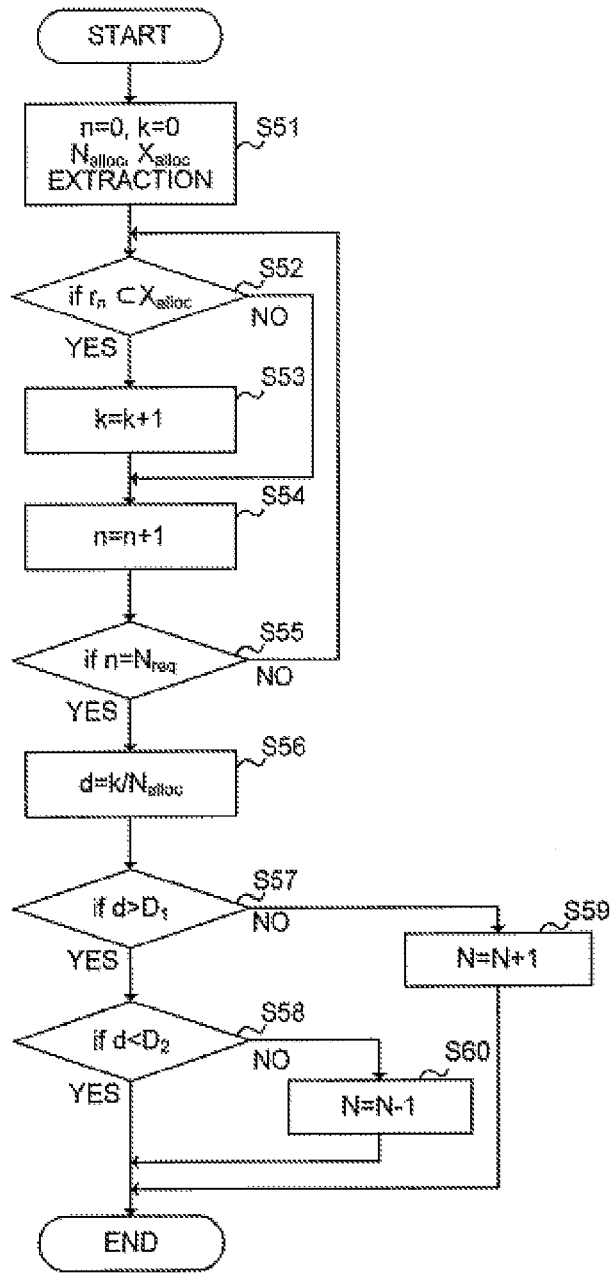
FIG. 20 is a flowchart showing an example of the operation of a statistical processing section.

FIG. 20 is a flowchart showing an example of the operation of the statistical processing section 410. The operations of the ratio calculating section 411 and number-of-selectable channel controlling section 412 are described with reference to FIG. 20. FIG. 20 uses the number of selectable channels N, the number of allocated channels $N_{alloc}$, a set of allocated channels $X_{alloc}$, the number of selection channels $N_{req}$, an nth element $r_n$ of the set of selection channels, first threshold $D_1$, second threshold $D_2$, calculation result d, and counter n, k. n is a variable indicating a number of $r_n$ of the set of selection channels, and k is a variable to count the number of channels allocated to the communication terminal apparatus 200 among the selection channels. The first threshold $D_1$ and second threshold $D_2$ are thresholds (calculation result thresholds) for judging the calculation result.

The ratio calculating section 411 initializes the counter n, k, and based on the scheduling control information, extracts the number of channels $N_{alloc}$, allocated to transmission data of which destination is each communication terminal apparatus 200 and a set of allocated channels $X_{alloc}$, (step S51).

The section 411 compares the set of allocated channels $X_{alloc}$, with the nth element $r_n$ of the set of selection channels sequentially, and counts the number of channels k allocated to the communication terminal apparatus 200 among the set of selection channels (step S52 to step S55). By this means, the section 411 extract the number of allocated channels k among frequency channels (selection channels) selected by each communication terminal apparatus 200.

Next, the ratio calculating section 411 calculates a ratio as a calculation result d by dividing the number of allocated channels k by the number of allocated channels $N_{alloc}$, and notifies the calculation result d to the number-of-selectable channel controlling section 412 (step S56).

The number-of-selectable channel controlling section 412 reads the thresholds $D_1$ and $D_2$ from the threshold storing section 413, and maintains a value of the number of selectable channels N when the calculation result d is larger than the first threshold $D_1$ (Yes in step S57), while being smaller than the second threshold $D_2$ (Yes in step S58). When the calculation result d is less than or equal to the first threshold $D_1$ (No in step S57), the section 412 adds "1" to the number of selectable channels N (step S59). When the calculation result d is more than or equal to the second threshold $D_2$ (No in step S58), the section 412 subtracts "1" from the number of selectable channels N (step S60). The section 412 outputs the determined number of selectable channels N to the transmission frame generating section 110 as the number-of-selectable control channel information. The numeric value of "1" to add or subtract is an example, other numeric values may be used, or the numeric value to add or subtract may be varied corresponding to a difference from the threshold.

Based on the number-of-selectable channel control information output from the statistical processing section, when the number of selectable channels is varied, the transmission frame generating section 110 generates the control information to notify the communication terminal apparatus 20 of varying the number of selectable channels, and multiplexes the information into a transmission frame.

When the communication terminal apparatus 200 receives the control information to notify of varying the number of selectable channels, the communication terminal apparatus 200 resets the number of selectable channels based on the control information to notify of varying the number of selectable channels.

Figure 21:
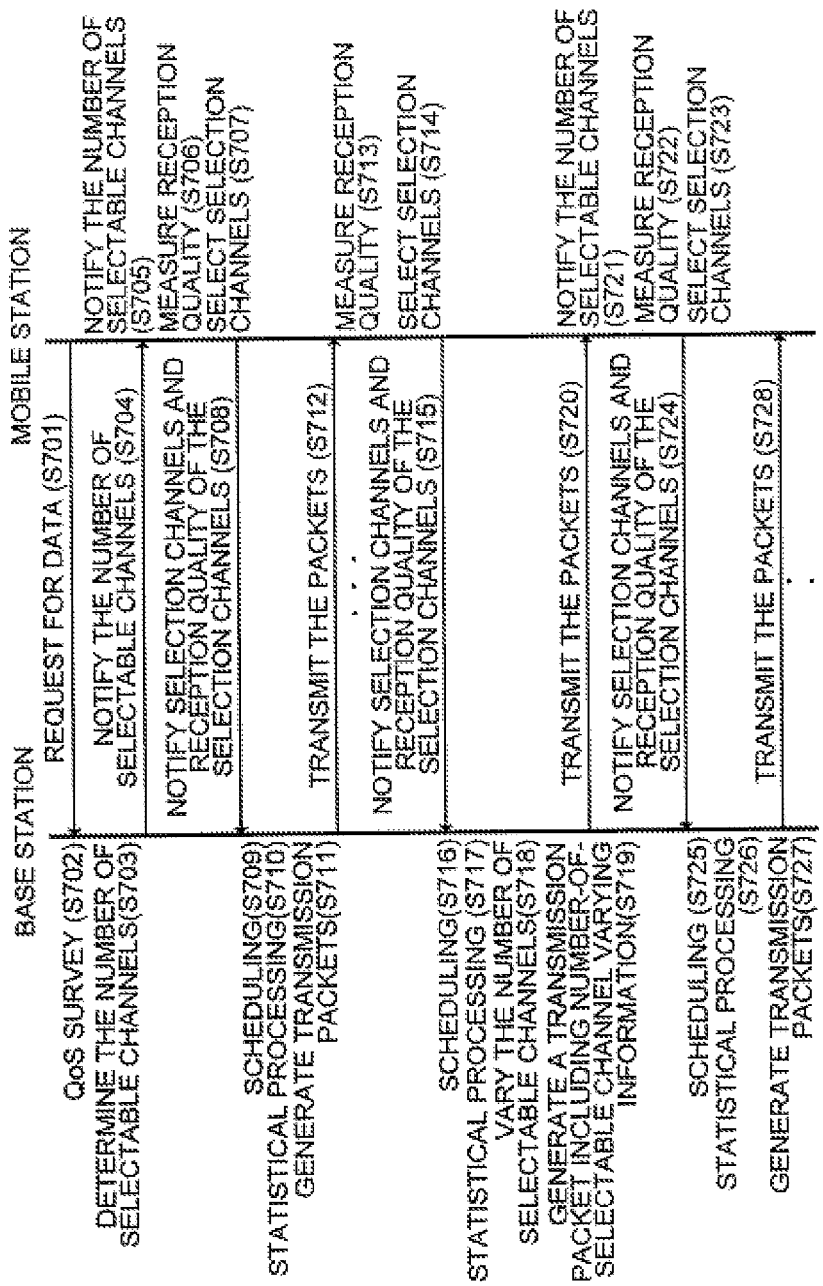
FIG. 21 is a sequence diagram showing an example of data transmission and reception between the base station and the mobile station in the seventh embodiment.

FIG. 21 is a sequence diagram showing an example of data transmission and reception between the base station (an example of the communication control apparatus 400) and mobile station (an example of the communication terminal apparatus 200).

The mobile station requests data such as the control information including the number of selectable channels and the like (step S701). The base station performs a QoS survey (step S702), and the statistical processing section 410 determines the number of selectable channels (step S703), and notifies the number of selectable channels (step S704). The mobile station notifies the number of selectable channels to the selection channel selecting section 261 (step S705), the reception quality measuring section 250 measures the reception quality (step S706), and the reception quality information generating section 260 selects selection channels, and generates the reception quality information (step S707). The mobile station notifies the base station of the generated reception quality information (selection channels and the reception quality of the selection channels) (step S708).

In the base station, the scheduler section 180 performs scheduling (step S709), the statistical processing section 410 performs the statistical processing (step S710), and the transmission frame generating section 110 and the like generate transmission packets (step S711), and transmit the generated transmission packets to the mobile station (step S712). Based on the last notified number of selectable channels (step S705), the mobile station measures the reception quality (step S713), selects selection channels (step S714), and notifies the reception quality information (step S715).

The base station performs the scheduling (step S716), and the statistical processing (step S717), and when a change occurs in the number of selectable channels (step S718) in the statistical processing (step S717), generates a transmission packet including the selectable channel varying information (step S719) and transmits the packet to the mobile station (step S720). The mobile station notifies the updated number of selectable channels to the selection channel selecting section 261 (step S721), measures the reception quality (step S722), selects selection channels using the updated number of selectable channels (step S723), and transmits the reception quality information (step S724). The subsequent operation is a repetition of the foregoing, and descriptions thereof are omitted.

Thus, in this embodiment, it is possible to adaptively control the reception quality information amount from the communication terminal apparatus for use in scheduling, and it is thereby possible to suppress the reception quality information amount with a low possibility of being used in scheduling. By this means, it is possible to reduce overhead due to the uplink control information, while maintaining efficiency of scheduling.

In addition, the calculation method of the ratio calculating section 411 as shown in FIG. 21 is an example, and other calculation methods may be used. For example, the calculation result d may be a value obtained by dividing the number of selection channels $N_{req}$ by the number of allocated channels $N_{alloc}$. Further, the ratio calculating section 411 may hold information of at least one of the scheduling control information, selection channel numbers and calculation results each of a plurality of previous times, or a combination of any of them, and calculate the calculation result by considering the information of the plurality of previous times.

Further, the statistical processing 410 of this embodiment can be applied to the communication control apparatus 300 as shown in FIG. 15. Furthermore, in the case of varying the number of allocation refusal channels as described in the fourth embodiment, the statistical processing section of this embodiment can be used to vary the number.

Eighth Embodiment

The eighth embodiment describes an aspect where the communication terminal apparatus notifies the communication control apparatus of information associated with a transmission rate such as the MCS information and the like as the reception quality.

Figure 22:
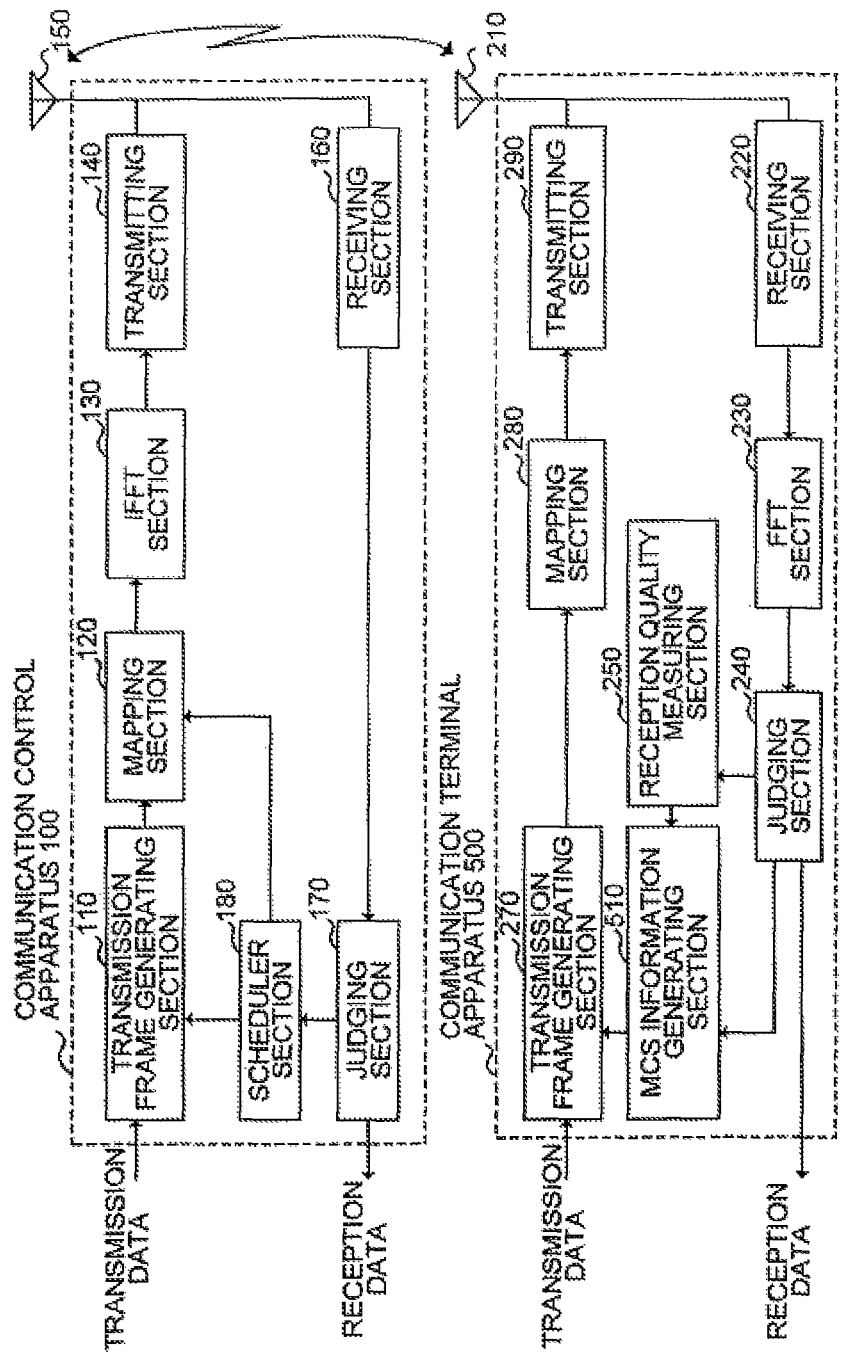
FIG. 22 is a block diagram showing a configuration example of an OFDMA system of the eighth embodiment.

FIG. 22 is a block diagram showing a configuration example of an OFDMA system of the eighth embodiment. The OFDMA system as shown in FIG. 22 is comprised of the communication control apparatus 100 and communication terminal apparatus 500, and has the components of FIG. 1 and an MCS information generating section 510 added to the communication terminal apparatus 500 as a substitute for the reception quality information generating section 260. Hereinafter, portions differing from FIG. 1 will be focused below to explain. The components assigned the same reference numerals and names as in FIG. 1 have the same functions, and descriptions thereof are omitted.

In each of the above-mentioned embodiments, the scheduler section 180 of the communication control apparatus has the MCS selecting section 182, and selects MCS based on the reception quality information notified from the communication terminal apparatus. In this embodiment, the MCS selecting function is provided on the communication terminal apparatus side.

Figure 23:
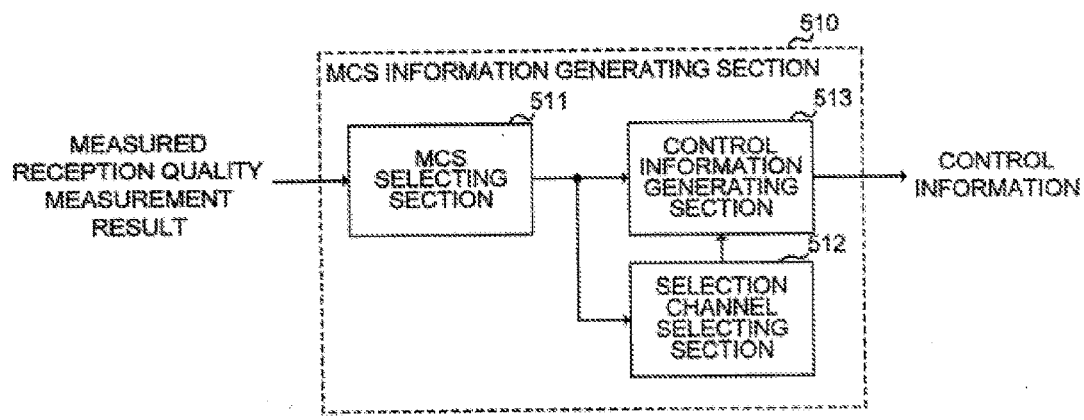
FIG. 23 is a block diagram showing an example of a configuration of an MCS information generating section of the eighth embodiment.
Figure 24:
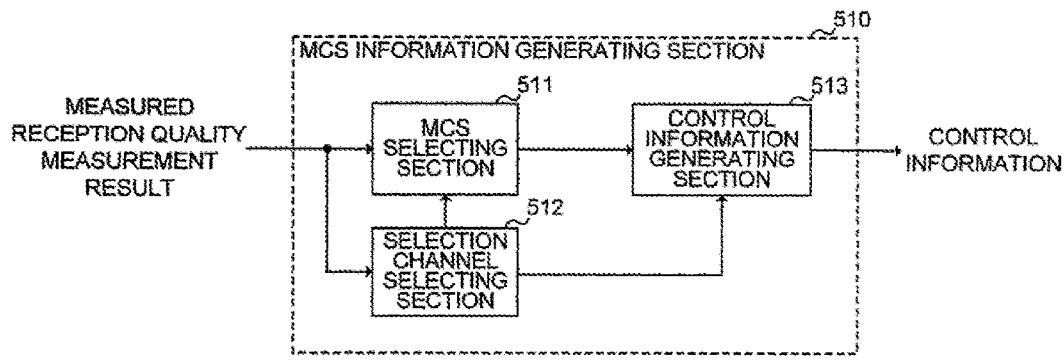
FIG. 24 is a block diagram showing an example of a configuration of the MCS information generating section different from that in FIG. 23 of the eighth embodiment.

FIG. 23 is a block diagram showing an example of a configuration of the MCS information generating section 510, and FIG. 24 is a block diagram showing an example of a configuration of the MCS information generating section 510 different from that in FIG. 23. The MCS information generating section 510 has an MCS selecting section 511, selection channel selecting section 512 and control information generating section 513. The flow of data is different between FIG. 23 and FIG. 24.

In the MCS information generating section 510 of FIG. 23, the MCS selecting section 511 selects MCS based on the reception quality measurement result in each frequency channel measured by the reception quality measuring section 250, and notifies the selected MCS to the selection channel selecting section 512 and control information generating section 513. The MCS selecting section 511 selects MCS for all the frequency channels. The selection channel selecting section 512 selects frequency channels with higher levels of MCS i.e. frequency channels expected to provide higher transmission rates as selection channels, and notifies the control information generating section 513 of frequency channel numbers of the selected selection channels and reception quality measurement results measured by the reception quality measuring section 250. The control information generating section 513 generates the control information including the frequency channel numbers of the selection channels selected by the selection channel selecting section 512, and the information of MCS of the selection channels selected by the selection channel selecting section 512.

In the MCS information generating section 510 in FIG. 24, the selection channel selecting section 512 selects selection channels from the channels in descending order of the reception quality measurement result in each frequency channel measured by the reception quality measuring section 250, and notifies the MCS information selecting section 511 of the frequency channel numbers of the selected selection channels, while further notifying the control information generating section 513 of the frequency channel numbers of the selected selection channels and reception quality measurement results measured by the reception quality measuring section 250. The MCS selecting section 511 selects MCS of the frequency channels selected as the selection channels by the selection channel selecting section 512, and notifies the control information generating section 513 of the information of selected MCS together with the frequency channel numbers. The control information generating section 513 generates the control information including the frequency channel numbers of the selection channels, and MCS of the selection channels selected.

Figure 25:
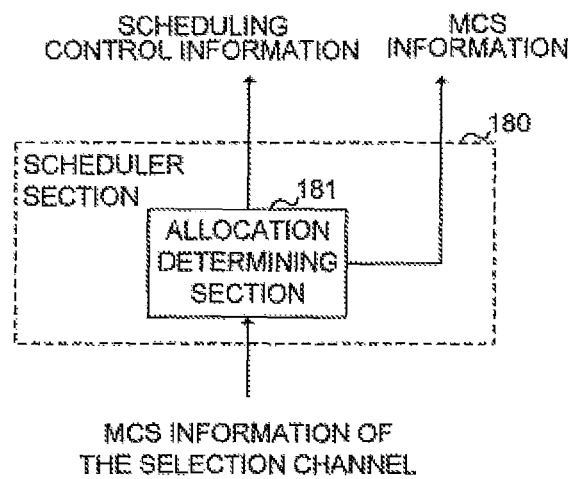
FIG. 25 is a diagram showing an example of a configuration of a scheduler section of the eighth embodiment.

FIG. 25 is a diagram showing an example of a configuration of the scheduler section 180 of this embodiment. The scheduler section 180 has the allocation determining section 181, and the allocation determining section 181 receives the reception quality information and MCS information of selection channels as its input, performs scheduling based on the reception quality information, and based on the scheduling result, associates the MCS information notified from the communication terminal apparatus 500 with the allocated frequency channel to notify the transmission frame generating section 110 and mapping section 120.

Thus, according to this embodiment, the communication terminal apparatus is capable of selecting MCS while selecting selection channels based on the MCS information. It is thereby possible to designate MCS on the communication terminal apparatus side.

Ninth Embodiment

This embodiment describes an aspect where each communication terminal apparatus selects selection channels, by using as an allocation measurement result the MCS information notified to each communication terminal apparatus from the communication control apparatus. Generally, in the case of OFDMA with the adaptive modulation scheme introduced thereto, the communication control apparatus notifies the communication terminal apparatus of allocation information in each frequency channel, and MCS for each communication terminal apparatus in each frequency channel, and the communication terminal apparatus extracts data symbols to the communication terminal apparatus based on the scheduling information after the FFT processing, and performs demodulation and decoding processing based on the notified MCS information. In the case of such a system, by enabling all the communication terminal apparatuses to decode the MCS information for each communication terminal apparatus in each frequency channel, it is possible to obtain the effect close to notification of the reception quality information (allocation measurement results) of all the frequency channels from the communication control apparatus to the communication terminal apparatus as described in the second embodiment. This embodiment is capable of achieving the effect using the configurations as shown in FIG. 22 and FIG. 23.

In each communication terminal apparatus 500, the reception quality measuring section 250 measures the reception quality in each frequency channel. The MCS selecting section 511 selects (calculates) the MCS level meeting predetermined quality from the reception quality measurement result in each frequency channel. The selection channel selecting section 512 compares the MCS level selected in the MCS selecting section 511 with each of the MCS levels of all the channels notified from the communication control apparatus 100, and selects a channel such that the MCS level obtained from the measurement value (the reception quality measurement result of the communication terminal apparatus) is higher than the MCS level notified from the communication control apparatus 100. At this point, as the method of comparing the MCS level obtained from the measurement value with the MCS level of respective one of all the channels notified from the communication control apparatus 100, the same method is performed as in calculation of the relative reception quality described in FIG. 14 of the second embodiment. For example, the MCS level is set according to accuracy of the quality of MCS, a numeric value corresponding to each MCS level is beforehand set, and channels are sequentially selected in descending order of a value obtained by subtracting a value corresponding to the MCS level of respective one of all the channels notified from the communication control apparatus from a numeric value corresponding to the MCS level obtained from the measurement value. Alternately, channels are sequentially selected in descending order of a value obtained by dividing the numeric value corresponding to the MCS level obtained from the measurement value by the value corresponding to the MCS level of respective one of all the channels notified from the communication control apparatus.

After selecting the selection channels, the communication terminal apparatus transmits the control information including the information indicating the selection channels and the information indicating the MCS levels in the selection channels to the communication control apparatus.

Thus, in this embodiment, it is possible to select selection channels using the MCS information. The communication terminal apparatus is capable of selecting selection channels using the MCS information notified from the communication control apparatus. It is thereby possible to suppress the downlink control information.

Tenth Embodiment

Figure 26:
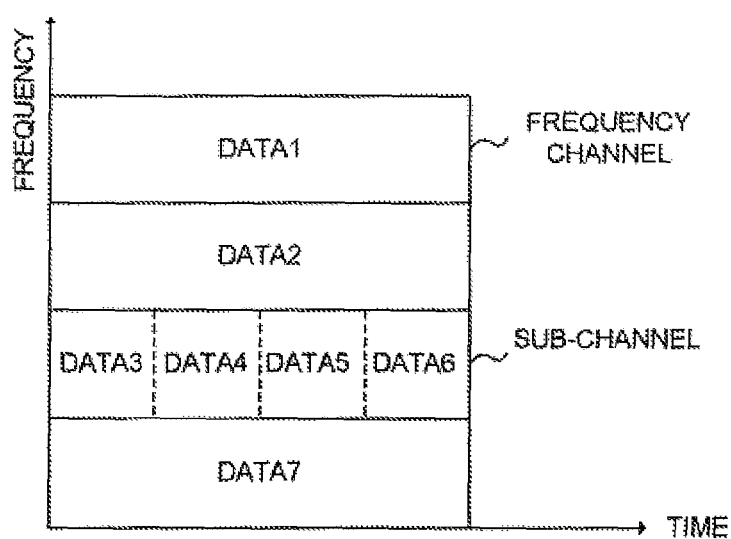
FIG. 26 is a diagram showing an example of a transmission frame of the tenth embodiment.

The tenth embodiment describes an aspect of scheduling in a system where a plurality of users is time-multiplexed into a transmission frame. FIG. 26 is a diagram showing an example of a transmission frame of this embodiment. In this embodiment, for the sake of convenience, as shown in FIG. 26, a channel divided in the time domain in a transmission frame in the first embodiment is called a sub-channel, and different transmission data is assigned to each sub-channel.

In a system for limiting the number of users multiplexed into a single transmission frame, as in channel allocation in the communication control apparatus of the first embodiment, transmission data is selected of which destination is a communication terminal apparatus with good reception quality, for each channel. At this point, when a selected channel is a channel to be divided into a plurality of sub-channels, communication terminal apparatuses are selected in descending order of excellence of the reception quality in the divided channel corresponding to the number of multiplexable communication terminal apparatuses, and the sub-channels are allocated to the transmission data of which destinations are respective communication terminal apparatuses.

Alternately, in a system for permitting a plurality of communication terminal apparatuses to be multiplexed into a single transmission frame, after allocating selection channels notified from the communication terminal apparatus using the same method as in the first embodiment, a channel that is not notified as a selection channel from any communication terminal apparatus is divided into a plurality of sub-channels to be allocated to transmission data. At this point, when an average value of the reception quality is notified, the sub-channels are sequentially allocated to transmission data of which destinations are communication terminal apparatuses with higher average values of the reception quality.

Further, a plurality of channels that are not notified as selection channels from any communication terminal apparatuses may be collected, divided into a plurality of sub-channels, and allocated to transmission data of which destinations are communication terminal apparatuses with poor reception quality. By this means, even though the reception quality is poor, the transmission quality is improved by the frequency diversity effect.

As the method of dividing a channel, the channel may be divided so that the sub-channel has an equal number of symbols, or the capacity of a sub-channel may be varied so as to allocate a sub-channel containing a higher number of symbols to a communication terminal apparatus having an high average value of the reception quality.

Thus, in this embodiment, a plurality of communication terminal apparatuses uses a single channel, and it is thereby possible to obtain the frequency diversity effect. The transmission equality can thereby be improved.

Eleventh Embodiment

The eleventh embodiment describes a case that the number of selectable channels is not notified to the communication terminal apparatus from the communication control apparatus and that a beforehand determined number is used, or an aspect where the number of selectable channels is determined on the communication terminal apparatus side.

Each of the above-mentioned embodiments describes the case where the communication control apparatus determines the number of selectable channels to beforehand (periodically, or whenever varying the number of selectable channels) notify the communication terminal apparatus. However, the communication control apparatus does not need to always notify the number of selectable channels. The communication terminal apparatus is capable of using a beforehand set value as the number of selectable channels. As an example, the communication terminal apparatus is capable of determining the number of selectable channels in the method as described above.

For example, the number of selectable channels may be a fixed number beforehand determined by the system or performance of the communication terminal apparatus. Further, in the system, a table may be set where QoS (each level of QoS) of data is beforehand associated with the number of selectable channels, so that the communication terminal apparatus is capable of determining the number of selectable channels based on QoS of data to request. As QoS of data, for example, the priority of transmission data to request is included.

Alternately, the communication terminal apparatus may beforehand hold a threshold (measurement result threshold) that is a criterion of the reception quality measurement result, and select, as selection channels, channels exceeding the measurement result threshold among the reception quality measurement results measured by the reception quality measuring section 250.

Further, it is possible to use the number of selectable channels set in advance, and the measurement result threshold. For example, the communication terminal apparatus may use a technique for selecting only frequency channels exceeding the measurement result threshold even when the number of the frequency channels does not reach the number of selectable channels, or selecting frequency channels corresponding to the number of selectable channels even when the number of frequency channels exceeding the measurement result threshold does not reach the number of selectable channels. Further, the communication terminal apparatus may use a technique for selecting frequency channels exceeding the measurement result threshold corresponding to the number of selectable channels or less.

Thus, in this embodiment, it is possible to select only frequency channels with good reception quality as selection channels. Further, it is possible to prevent an excess number of frequency channels from being selected as selection channels. It is thus possible to perform more efficient notification of the reception quality information.

In addition, also in the case that the communication control apparatus determines the number of selectable channels to notify in each of the above-mentioned embodiments, it is possible to determine the number of selectable channels using a threshold as in this embodiment.

Twelfth Embodiment

The twelfth embodiment describes an aspect where the communication terminal apparatus varies the number of selectable channels.

The eleventh embodiment describes the case that the number of selectable channels is known, or a fixed value. In starting communications, the communication terminal apparatus requests channels in the range of the number of selectable channels as described in the eleventh embodiment.

Figure 27:
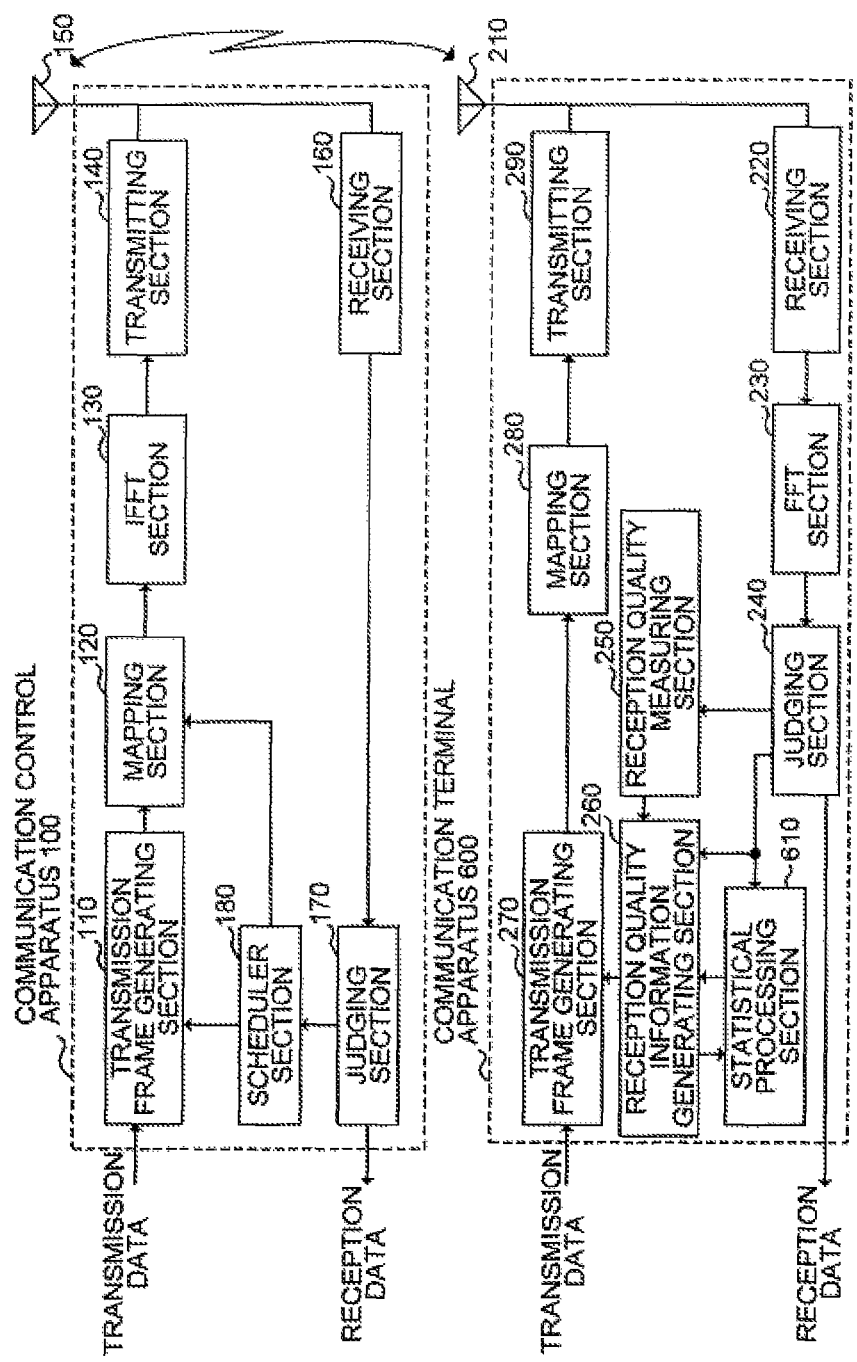
FIG. 27 is a block diagram showing a configuration example of an OFDMA system of the twelfth embodiment.

FIG. 27 is a block diagram showing a configuration example of an OFDMA system of the twelfth embodiment. The OFDMA system as shown in FIG. 27 is comprised of the communication control apparatus 100 and communication terminal apparatus 600, and has the components of FIG. 1 and a statistical processing section 610 added to the communication terminal apparatus 600. Hereinafter, portions differing from FIG. 1 will be focused below to explain. The components assigned the same reference numerals and names as in FIG. 1 have the same functions, and descriptions thereof are omitted.

The statistical processing section 610 has the same configuration as that of the statistical processing section 410 provided in the communication terminal apparatus 400 as shown in FIG. 19 to perform the same processing, and specific descriptions thereof are omitted. In this embodiment, the statistical processing section 610 receives respective pieces of information from components as described below. The judging section 240 notifies the statistical processing section 610 (ratio calculating section) of the judged scheduling control information. The reception quality information generating section 260 notifies the statistical processing section 610 (ratio calculating section) of selection channels numbers (frequency channel numbers for identifying selection channels selected by the selection channel selecting section 261). Based on the notified information, the statistical processing section 610 performs the same processing as in FIG. 20, determines the number of selectable channels, and notifies the determined number of selectable channels to the selection channel selecting section 261 of the reception quality information generating section 260.

Thus, in this embodiment, it is possible to adaptively control the reception quality information amount for use in scheduling notified from the communication terminal apparatus to the communication control apparatus. The amount can be varied to be increased when the reception quality information is insufficient, while being decreased when the information is excess, and thus, can be made closer to the reception quality information amount suitable for scheduling in the communication control apparatus.

Further, the number of requested channels may be varied by changing the measurement result threshold as described in the eleventh embodiment. The statistical processing section 610 compares the calculated calculation result with the first threshold $D_1$ (calculation result threshold used in FIG. 20), and varies the measurement result threshold to decrease when the calculated calculation result is smaller than the first threshold $D_1$. Further, the statistical processing section 610 compares the calculated calculation result with the second threshold $D_2$ (calculation result threshold used in FIG. 20), and varies the measurement result threshold to increase when the calculated calculation result is larger than the second threshold $D_2$. The selection channel selecting section 261 selects selection channels based on the measurement result threshold varied in the statistical processing section 610. The number of frequency channels with the reception quality exceeding the threshold increases by decreasing the measurement result threshold, while the number of frequency channels with the reception quality exceeding the threshold decreases by increasing the measurement result threshold, and the communication terminal apparatus and communication control apparatus are thereby capable of obtaining the same effect as in varying the number of selectable channels.

Furthermore, it is possible to use the number of selectable channels set in advance, and the measurement result threshold. For example, the communication terminal apparatus may use a technique for selecting only frequency channels exceeding the measurement result threshold even when the number of the frequency channels does not reach the number of selectable channels, or selecting frequency channels corresponding to the number of selectable channels even when the number of frequency channels exceeding the measurement result threshold does not reach the number of selectable channels. Further, the communication terminal apparatus may use a technique for selecting frequency channels exceeding the measurement result threshold corresponding to the number of selectable channels or less. The communication control apparatus may determine the number of selectable channels based on the priority of data to request transmission thereof. In addition, the control of the number of selectable channels in the communication control apparatus is described in the sixth embodiment as described previously.

Thus, in this embodiment, it is possible to select only frequency channels with good reception quality as selection channels. Further, it is possible to prevent an excess number of frequency channels from being selected as selection channels. It is thus possible to perform more efficient notification of the reception quality information.

Thirteenth Embodiment

Each of the above-mentioned embodiments describes the case where the communication terminal apparatus selects selection channels, and reports the information indicating the reception quality measurement result itself as the information indicating the reception quality measurement result, in reporting to the communication control apparatus the reception quality information including the selection channel information for identifying the selection channels, and the information indicating the reception quality measurement results in the selection channels. This embodiment describes a case of reporting, as the information indicating the selection channel measurement result, the reception quality information including information indicating the reception quality measurement result (difference reference value) itself of at least one channel, and information indicating difference information of the reception quality measurement results of a plurality of channels and the difference reference value. The communication control apparatus and the communication terminal apparatus of this embodiment are capable of using each component described in each of the above-mentioned embodiments.

For example, in the case of selecting frequency channels as shown in FIG. 7 as selection channels as in the first embodiment, the communication terminal apparatus (the control information generating section of the reception quality information generating section, the control information generating section of the MCS information generating section) reports to the communication control apparatus the selection channel information for identifying Ch2 and Ch5 that are frequency channel numbers, information indicating CINR level 2 that is the reception quality measurement result itself of Ch2, and information indicating "6"(=8−2) that is a difference in the reception quality measurement result between Ch2 and Ch5. After receiving the selection channel information for identifying Ch2 and Ch5 that are frequency channel numbers, the information indicating CINR level 2 that is the reception quality measurement result itself of Ch2, and the information indicating "6" (=8−2) that is a difference in the reception quality measurement result between Ch2 and Ch5, the communication control apparatus (the allocation determining section of the scheduler section) decodes "8" that is the reception quality measurement result itself of Ch5 from "6" that is a difference in the reception quality measurement result between Ch2 and Ch5 and "2" that is the reception quality measurement result itself of Ch2.

By this means, the communication terminal apparatus and the communication control apparatus can share the same information. Further, in the case of selecting part of frequency channels from all the bands, the distribution of the difference in the reception quality measurement result between selected selection channels i.e. the variation in the selection channel measurement result between selected selection channels is smaller than the variation in the channel measurement result among all the bands. Therefore, it is possible to represent the difference information of a plurality of reception quality measurement results with a lower number of bits (information amount).

In addition, this embodiment describes the case of generating the reception quality information using the reception quality measurement result itself of Ch2, and the difference in the reception quality measurement result between Ch2 and Ch5, but a combination of a selection channel to report the reception quality measurement result itself and a selection channel to report the difference is not limited thereto. For example, the reception quality may be generated using the reception quality measurement result itself of Ch5, and the difference in the reception quality measurement result between Ch5 and Ch2. Thus, required is that the communication terminal apparatus reports the reception quality information including the information indicating the measurement result itself of at least one selection channel, and the information indicating the difference information of the reception quality measurement results of a plurality of channels, and that the communication control apparatus is capable of decoding the reception quality measurement result in each selection channel.

Further, in the foregoing, a selection channel to notify its reception quality measurement result itself is selected as a channel (reference channel) to be the reference, and a difference (difference value) between the reception quality measurement result (reference measurement result, difference reference value) of the selected reference channel and each of the reception quality measurement results of the other selection channels is notified as the information to notify the reception quality results of the other selection channels, but when an average measurement value (average CINR) obtained by averaging the reception quality measurement values is calculated, the average measurement value can be used as the difference reference value as a substitute for the reception quality measurement result of the channel to be the reference. In this case, the reception quality information is generated by calculating a difference between the reception quality measurement result and average measurement result in each selection channel. In addition, a difference reference value (reference measurement result) as the reference in calculating the difference does not need to be always notified from the communication terminal apparatus to the communication control apparatus. A predetermined value may be determined in the system in advance, or either the communication control apparatus or the communication terminal apparatus may first notify the difference reference value to the communicating party, and then, the difference may be calculated using the notified difference reference value. For example, after once notifying a reception quality measurement value of an arbitrary channel as a difference reference value, for the arbitrary channel, when the reception quality measurement value is notified next, a difference from the notified difference reference value may be notified.

As described above, in this embodiment, it is described that in the communication terminal apparatus, the reception quality information generating section calculates a difference value between the reception quality measurement value in the selection channel and the difference reference value as the reference of the reception quality measurement value, and generates the reception quality information including the selection channel information and the difference value, while in the communication control apparatus, the receiving section receives the reception quality information including the selection channel information and the difference value obtained by calculating a difference value between the reception quality measurement value in the selection channel and the difference reference value as the reference of the reception quality measurement value, and the scheduler section calculates the reception quality measurement value in the selection channel based on the difference value, and determines a channel to allocate to the transmission data based on the calculated reception quality measurement result.

Thus, by adopting the configuration where the communication terminal apparatus selects selection channels, and reports as the information indicating the selection channel measurement results in the selection channels, the reception quality information including the information indicating at least one reception quality measurement result (reception quality measurement result itself) to be the reference, and the information indicating the difference information of the reception quality measurement result in each selection channel, and the communication control apparatus decodes the reception quality measurement result in each selection channel based on the notified reception quality information, and it is thereby possible to notify the reception quality information with more efficiency.

In addition, each of the above-mentioned embodiments describes the example that the communication terminal apparatus selects selection channels based on the predetermined condition, but the case of selecting channels of a predetermined range from among a plurality of channels as the selection channels is included in the concept of selecting part of frequency channels from a plurality of channels as selection channels. For example, a case may be adopted that the communication control apparatus beforehand specifies channels for the communication terminal apparatus to report the reception quality information. In this case, the communication terminal apparatus judges the channel numbers, and is thereby capable of selecting selection channels. In selecting selection channels, and/or setting the number of selectable channels, even in the case that the predetermined condition differs from one another, there may be a case that each of the above-mentioned embodiments is applicable. Thus, in the case of selecting part of channels from a plurality of channels as selection channels, and notifying the selected reception quality information, it is possible to apply each of the above-mentioned embodiments.

What is claimed is:

1. A terminal apparatus for performing communications with a base station using a plurality of frequency channels, comprising:
   a reception quality measuring section configured to measure reception quality;
   a selection channel selecting section configured to select a set of frequency channels as selection channels from the plurality of frequency channels;
   a reception quality information generating section configured to generate first information for specifying the selection channels, second information indicating one reception quality value of the selection channels, and third information indicating one reception quality value of the plurality of frequency channels; and
   a transmitting section configured to transmit each of the first, second and third information to the base station.

2. The terminal apparatus according to claim 1, further comprising:
   a receiving section configured to receive a control signal; and
   a judging section configured to determine the number of the selection channels based on the control signal.

3. The terminal apparatus according to claim 1, wherein the second information is used for specifying a modulation scheme or a coding rate.

4. The terminal apparatus according to claim 1, the reception quality value of the selection channels is an average value of the reception quality measurement results of the selection channels.

5. The terminal apparatus according to claim 1, the reception quality value of the plurality of frequency channels is an average value of the reception quality measurement results of the plurality of frequency channels.

* * * * *

UNITED STATES PATENT AND TRADEMARK OFFICE
CERTIFICATE OF CORRECTION

PATENT NO. : 9,768,938 B2
APPLICATION NO. : 14/080338
DATED : September 19, 2017
INVENTOR(S) : Nogami et al.

Page 1 of 1

It is certified that error appears in the above-identified patent and that said Letters Patent is hereby corrected as shown below:

In the Specification

In Column 1, Line 8, delete "Entry" and insert -- Entry of --, therefor.

In Column 26, Line 6, delete "FIG." and insert -- FIG. 8B; --, therefor.

In Column 37, Line 51, delete "doted" and insert -- dotted --, therefor.

In Column 41, Line 36, delete "doted" and insert -- dotted --, therefor.

Signed and Sealed this
Fourth Day of October, 2022

Katherine Kelly Vidal
*Director of the United States Patent and Trademark Office*